(12) United States Patent
Josephson

(10) Patent No.: US 10,289,204 B2
(45) Date of Patent: May 14, 2019

(54) APPARATUSES FOR CONTROLLING ELECTRICAL DEVICES AND SOFTWARE PROGRAMS AND METHODS FOR MAKING AND USING SAME

(71) Applicant: Quantum Interface, LLC, Austin, TX (US)

(72) Inventor: Jonathan Josephson, Austin, TX (US)

(73) Assignee: Quantum Interface, LLC, Austin, TX (US)

(*) Notice: Subject to any disclaimer, the term of this patent is extended or adjusted under 35 U.S.C. 154(b) by 862 days.

(21) Appl. No.: 14/504,391

(22) Filed: Oct. 1, 2014

(65) Prior Publication Data

US 2016/0320860 A1 Nov. 3, 2016

Related U.S. Application Data

(63) Continuation-in-part of application No. 13/677,627, filed on Nov. 15, 2012, now Pat. No. 9,746,935, and
(Continued)

(51) Int. Cl.
| | |
|---|---|
| *G06F 3/048* | (2013.01) |
| *G06F 3/01* | (2006.01) |
| *G06F 3/0485* | (2013.01) |
| *G06F 3/0482* | (2013.01) |
| *G06F 3/0484* | (2013.01) |
| *H04L 29/08* | (2006.01) |

(Continued)

(52) U.S. Cl.
CPC ............ *G06F 3/017* (2013.01); *G06F 3/0482* (2013.01); *G06F 3/0485* (2013.01); *G06F 3/04847* (2013.01); *G06F 3/04883* (2013.01); *H04L 12/282* (2013.01); *H04L 12/2803* (2013.01); *H04L 29/06* (2013.01); *H04L 67/16* (2013.01); *H04L 67/18* (2013.01); *H04L 67/36* (2013.01); *H04W 4/02* (2013.01); *G08C 2201/32* (2013.01); *H04L 69/329* (2013.01); *H04L 2012/285* (2013.01)

(58) Field of Classification Search
CPC ....................... G06F 2203/04104; G06F 3/017
See application file for complete search history.

(56) References Cited

U.S. PATENT DOCUMENTS

| | | | | |
|---|---|---|---|---|
| 6,339,940 B1* | 1/2002 | Yamada | .............. | C03B 19/1407 |
| | | | | 65/17.4 |
| 6,396,523 B1* | 5/2002 | Segal | .................... | G06F 1/1626 |
| | | | | 345/173 |

(Continued)

FOREIGN PATENT DOCUMENTS

WO    2013-095677 A1    6/2013

OTHER PUBLICATIONS

PCT ISR WO PCT/US2014/058706.
PCT ISR WO PCT/US14/058707.

*Primary Examiner* — William Bashore
*Assistant Examiner* — Rayeez Chowdhury
(74) *Attorney, Agent, or Firm* — Robert W Strozier

(57) ABSTRACT

An apparatus including a movement sensor and processing unit, where sensed movement, especially velocity and/or acceleration and changes thereof, is used to control real and/or virtual objects, where no hard selection protocol is used and output signals and/or commands occur with a change in velocity or acceleration.

24 Claims, 25 Drawing Sheets

Related U.S. Application Data a continuation-in-part of application No. 13/677,642, filed on Nov. 15, 2012, now Pat. No. 9,703,388.

(60) Provisional application No. 61/885,453, filed on Oct. 1, 2013.

(51) Int. Cl.
   *H04L 12/28* (2006.01)
   *H04L 29/06* (2006.01)
   *H04W 4/02* (2018.01)
   *G06F 3/0488* (2013.01)

(56) References Cited

U.S. PATENT DOCUMENTS

| | | | |
|---|---|---|---|
| 2002/0027628 A1* | 3/2002 | Ishizuka | B05D 3/0413 349/118 |
| 2002/0126421 A1* | 9/2002 | Takahashi | B24B 37/00 360/313 |
| 2004/0095353 A1* | 5/2004 | Ueda | A63F 13/10 345/473 |
| 2006/0166620 A1* | 7/2006 | Sorensen | G06F 3/011 455/41.1 |
| 2008/0034331 A1 | 2/2008 | Josephson et al. | |
| 2008/0036743 A1* | 2/2008 | Westerman | G06F 3/038 345/173 |
| 2010/0020025 A1* | 1/2010 | Lemort | G06F 3/04883 345/173 |
| 2010/0134425 A1 | 6/2010 | Storrusten | |
| 2011/0043443 A1 | 2/2011 | Kawano et al. | |
| 2011/0055773 A1 | 3/2011 | Agarawala et al. | |
| 2011/0221974 A1 | 9/2011 | Stern et al. | |
| 2011/0289456 A1 | 11/2011 | Reville et al. | |
| 2012/0050157 A1 | 3/2012 | Latta et al. | |
| 2012/0101579 A1* | 4/2012 | de Villiers | A61F 2/4425 623/17.16 |
| 2012/0216143 A1 | 8/2012 | Shiplacoff et al. | |
| 2013/0135194 A1 | 5/2013 | Josephson | |

\* cited by examiner

US 10,289,204 B2

APPARATUSES FOR CONTROLLING ELECTRICAL DEVICES AND SOFTWARE PROGRAMS AND METHODS FOR MAKING AND USING SAME

RELATED APPLICATIONS

This application claims the benefit of and provisional priority of United Application Ser. No. 61/885,453 filed Oct. 1, 2013. This application is also related to U.S. patent application Ser. No. 10/384,195 filed 7 Mar. 2003, now U.S. Pat. No. 7,831,932 issued 9 Nov. 2010, U.S. patent application Ser. No. 11/891,322 filed 9 Aug. 2007, now U.S. Pat. No. 7,861,188 issued 28 Dec. 2010, and U.S. patent application Ser. No. 12/978,690 filed 27 Dec. 2010, now U.S. Pat. No. 8,788,966 issued 22 Jul. 2014, and claim priority to and the benefit of U.S. patent application Ser. No. 13/677,627 filed 15 Nov. 2012, and U.S. patent application Ser. No. 13/677,642 filed 15 Nov. 2012.

BACKGROUND OF THE INVENTION

1. Field of the Invention

Embodiments of the present invention relate to apparatuses for controlling virtual or real objects including electrical devices, hardware devices, software programs, software products, software systems, and/or software objects included in software programs, products, and/or systems and methods for making and using same.

More particularly, embodiments of this invention relate to apparatuses for controlling virtual or real objects including electrical devices, hardware devices, software programs, software products, software systems, and/or software objects included in software programs, products, and/or systems, where the apparatuses include (1) one object or a plurality of objects, (2) at least one motion sensor capable of sensing linear and/or angular motion, linear and/or angular velocity, linear and/or angular acceleration, changes in linear and/or angular motion, changes in linear and/or angular velocity, changes in linear and/or angular acceleration, and (3) at least one processing unit in control communication with the object or objects for converting sensor output into commands for controlling some or all of the objects and/or some or all of the attributes associated with some or all of the objects. The present invention also relates to methods for making and using the apparatuses.

2. Description of the Related Art

The demands and requirements of electrical switches, software programs, software systems, software products, software objects, software menus and user interfaces continue to accelerate. In fact, in residential and commercial environments, the number of electrical switches and user interfaces has grown as fast or faster than the number of new electrical devices introduced in the marketplace. As the number of electrical switches and user interfaces has increased, the need for sure, certain activation and deactivation of the switches and controllers for real and/or virtual objects has become ever more apparent. As our society has grown increasingly technical, the number of software object, menus and systems has grown exponentially. The need for user interfaces that can be used across all these platforms is greater now than ever.

For example in both residential, industrial and commercial environments, overhead lighting is typically controlled by a manual on-off switch on the wall. The switch is in the form of a mechanical lever that simply causes the circuit to open or close. Very little has changed over the years in this ubiquitous standard electrical switch.

Some minor variations, however, are found in the prior art. U.S. Pat. No. 2,421,881 to Heasty discloses the use of a rotatable disk with a number of recesses around its periphery. The disk is supported on a hub and two electric contact arms provide electric current through conductor rods in alternately spaced recesses. As the disk is rotated, electrical contact is made and then broken.

U.S. Pat. No. 2,863,010 to Riedl discloses a spring loaded push plate that is designed to activate all electrical contacts underneath the plate at once or to selectively engage electric contacts underneath the plate by rocking the plate in the direction of the desired electrical contact.

Additionally, it is known in the art to provide variable control over electrical devices, for example, again, lighting fixtures, by means of so-called dimmer switches. Functioning in a manner well-known in the art, the dimmer switch is activated by the well-known lever or, in some cases, by a knob that is simply twisted.

U.S. Pat. Nos. 7,861,188, 7,831,932, and 8,788,966 disclosed apparatuses and methods for controlling devices and/or programs and/or objects based on motion and changes in a direction of motion.

While motion based systems and methods have been disclosed, there is still a need in the art for motion-based apparatuses, systems, and methods, especially apparatuses, systems, and methods that are capable of monitoring and acting on linear and/or angular velocity, linear and/or angular acceleration, changes in linear and/or angular velocity, and/or changes in linear and/or angular acceleration to affect changes in real and/or virtual objects or collections of real and/or virtual objects.

SUMMARY OF THE INVENTION

Control Systems

Embodiments of the present invention also provide control systems for controlling real and/or virtual objects such as electrical devices, hardware devices, software programs and/or software objects, where the systems convert movement(s) into commands for controlling the real and/or virtual objects, where the movement(s) including linear and/or angular motion, linear and/or angular velocity, linear and/or angular acceleration, changes in linear and/or angular motion, changes in linear and/or angular velocity, changes in linear and/or angular acceleration, rates of change in direction, rates of change in linear and/or angular velocity, rates of change of linear and/or angular acceleration, and/or mixtures or combinations thereof. The changes in movement direction, velocity, and/or acceleration may also include stops and/or timed holds in conjunction with the changes in direction, velocity and/or acceleration.

Embodiments of the present invention provide control systems for controlling real and/or virtual objects and/or virtual systems. The systems include at least one motion sensor or a motion sensing apparatus including a motion-sensing component for sensing movement within at least one active sensing field, a processing unit for converting sensor output into commands for controlling the real and/or virtual objects and/or virtual systems in communication with the processing unit, and optionally a user interface for human interaction. Of course, these processors and components may be combined into one or more units. The movement may result from movement of an animal or a human, an animal or human body part, or an object under the control of an animal or a human or an autonomous robot or robotic system. Movement may occur in or around a sensor, array of sensors, or the sensor(s) itself may move, or a combination thereof. The movement may include motion in linear and/or angular motion in any direction, linear and/or angular velocity in any direction, linear and/or angular acceleration, changes in linear and/or angular motion, changes in linear and/or angular velocity, changes in linear and/or angular acceleration, rates of change in direction, rates of change in linear and/or angular velocity, rates of change of linear and/or angular acceleration, and/or mixtures or combinations thereof. The commands permit users to scroll through lists or menus, to simultaneously select and scroll through lists or menus, to simultaneously select and scroll through sublists or submenus, to select, control, or simultaneously select and control at least one real object or at least one list of real objects and/or virtual object or at least one list of virtual objects, to simultaneously select and control at least one real object attribute and/or at least one virtual objects attribute, or to simultaneously select and proportionally control at least one real object, at least one virtual object, at least one real object attribute, and/or at least one virtual object attribute by discernible changes in movement sensed by the sensor(s) and/or the processing unit(s). In certain embodiments, the systems may also include at least one remote control unit. In these apparatuses, the communication between the various components may be direct via wires or hardware connections and/or indirect via wireless connections.

Embodiments of the present invention also provide systems including at least one motion sensor capable of sensing movement, where movement within at least one sensing zone of the sensor(s) produces at least one output signal for selecting, controlling or simultaneously selecting and controlling one or a plurality of the real objects and/or one or a plurality of the virtual objects or for simultaneously selecting and controlling one or a plurality of attributes of the one or a plurality of the real and/or virtual objects. Moreover, the systems may allow attribute selection and control based on linear and/or angular motion, linear and/or angular velocity, linear and/or angular acceleration, changes in linear and/or angular motion, changes in linear and/or angular velocity, changes in linear and/or angular acceleration, rates of change in direction, rates of change in linear and/or angular velocity, rates of change of linear and/or angular acceleration, and/or mixtures or combinations thereof. Furthermore, the systems may include a preset or programmable sequence of motions within the motion sensor sensing zone, where each sequence causes a preset or pre-programmed response of selected devices and/or programs. These sequences may also include changes in velocity or acceleration within the sequences, where these changes are used to give different commands based upon these changes in velocity or acceleration. In this way, the same preset or programmable sequence of motions may have different outcomes based upon differences of velocity or acceleration within the sequence of motions, yielding different output commands. Additionally, the systems may utilize the preset or programmable sequences to control all of the real objects and/or virtual list or objects or any subset of the real and/or virtual objects, where different patterns or sequences may result in activating preset real objects and/or virtual lists or objects settings or a pre-programmed global or partial global preset setting such as mood lighting, music settings, virtual object selections and settings, etc.

Method for Using the Control System of this Invention

Embodiments of the present invention provide methods for controlling at least one real object and/or at least one virtual list or object or a plurality of real objects and/or virtual lists or objects using systems of this invention. The methods include sensing movement within at least one sensing zone of at least one motion sensor or motion sensing apparatus, where the movement includes linear and/or angular motion, linear and/or angular velocity, linear and/or angular acceleration, changes in linear and/or angular motion, changes in linear and/or angular velocity, changes in linear and/or angular acceleration, rates of change in direction, rates of change in linear and/or angular velocity, rates of change of linear and/or angular acceleration, and/or mixtures or combinations thereof. The methods also include producing at least one output signal from the sensor(s) based on the movement detected within the sensing zone(s). The methods also include converting the output signals into control functions for controlling the real objects, the virtual objects, real object attributes, and/or virtual object attributes, or any combination thereof. The control functions include scroll functions, selection functions, activate functions, attribute control functions, simultaneous select and scroll functions, simultaneous select and device and/or software program activate functions, simultaneous select and attribute activate functions, simultaneous select and attribute control functions, and/or simultaneous device and/or software program activate and attribute control functions, or any combination thereof.

User Interfaces of this Invention

Embodiments of the present invention also provide user interfaces including at least one motion sensor or motion sensing component, at least one processing unit, or at least one motion sensor/processing unit and at least one communication hardware and software unit. That is, motion sensor and processing unit may be combined, in fact all these may be combined into one unit. Sensors may be moved (such as in a phone) or the sensors may detect an object or objects moving, or a combination thereof. The motion sensors sense movement within at least one sensing zone and produce at least one output signal corresponding to the sensed movement, where the movement includes linear and/or angular motion, linear and/or angular velocity, linear and/or angular acceleration, changes in linear and/or angular motion, changes in linear and/or angular velocity, changes in linear and/or angular acceleration, rates of change in direction, rates of change in linear and/or angular velocity, rates of change of linear and/or angular acceleration, or mixtures or combinations thereof. The processing units convert the sensor output signals into command and control functions for controlling one real object and/or list, one virtual object and/or list, a plurality of real objects and/or lists, a plurality of virtual objects and/or lists, attributes of the real objects and/or attributes or the virtual objects and/or lists, and/or mixtures and combinations thereof. The communication units send the command and control functions to selected real and/or virtual objects. The motion sensors are capable of sensing movement of an animal or human, an animal or human body part, or an object controlled by an animal or human within the sensing zones, autonomous robots or robotic systems, or any combination thereof.

Methods for Using the User Interfaces of this Invention

Embodiments of the present invention provide methods for manipulating one real object and/or list and/or virtual object and/or list or a plurality of real objects and/or lists and/or virtual objects and/or lists and/or associated attributes (executable or controllable) using interfaces or apparatuses of this invention, including the steps of sensing movement within at least one sensing zone of at least one motion sensor. The movements includes linear motion and/or angular motion, linear velocity and/or angular velocity, linear acceleration and/or angular acceleration, changes in linear motion and/or angular motion, changes in linear velocity and/or angular velocity, changes in linear acceleration and/or angular acceleration, rates of change in direction of motion, rates of change in linear velocity and/or angular velocity, rates of change of linear acceleration and/or angular acceleration, and mixtures or combination thereof. The methods also include producing at least one output signal from the sensors. The methods also include converting the output signals into control functions for controlling the real and/or virtual objects, real object attributes, and/or virtual object attributes. The control functions include scroll functions, simultaneous select and scroll functions, simultaneous select and activate functions, simultaneous select and attribute activate functions, simultaneous select and attribute control functions, and/or simultaneous activate and attribute control functions, or any combination thereof. Of course, multiple outputs from multiple sensors and/or inputs may produce multiple output commands, a single command, or a combination of commands at different output rates and sequences. For examples, dynamic wings in aircraft including advanced swept-wing designs, where the wings will fold down and/or sweep at different rates, providing amazing turning capabilities. A right hand controlling a UAV from a domed surface may accelerate the hand and all the fingers forward while simultaneously moving the thumb away from the center of the hand, causing the left wing to drop down slightly, causing a banking of the plane to the left.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

Figure 1A:
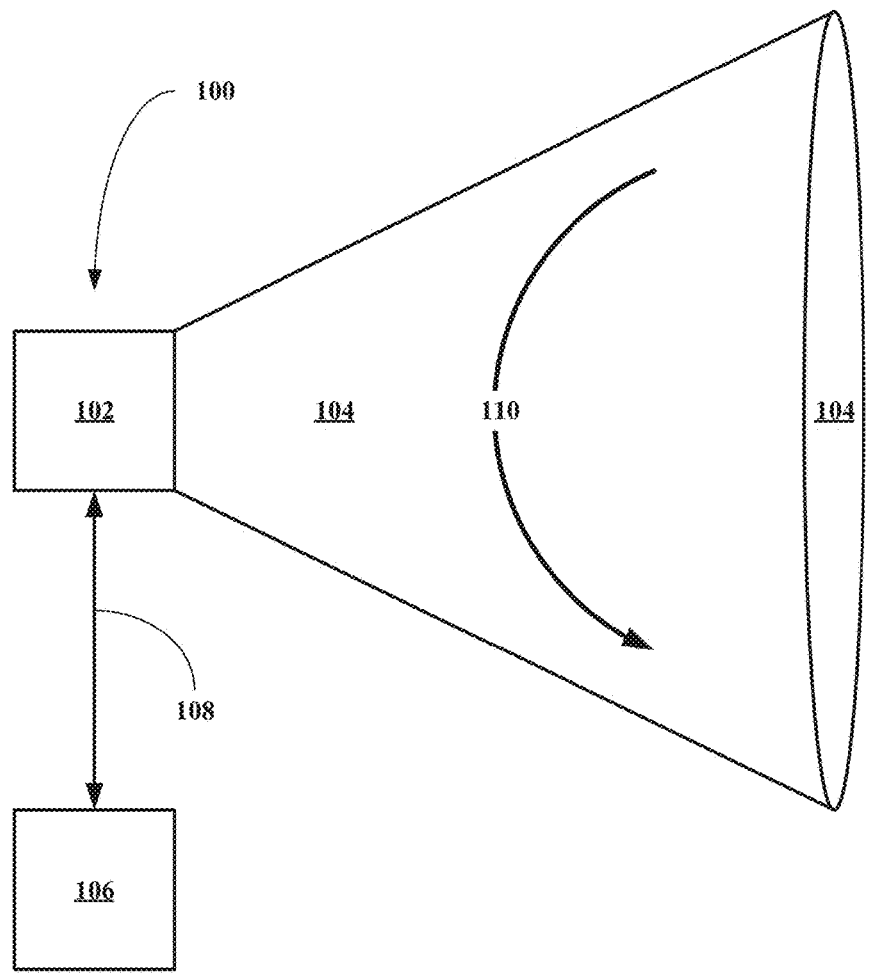
FIG. 1A depicts an embodiment of a system of this invention sensing an arcuate path illustrating simple angular motion.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±10% of the stated value. In other embodiments, the value is within ±5% of the stated value. In other embodiments, the value is within ±2.5% of the stated value. In other embodiments, the value is within ±1% of the stated value.

The term "motion" and "movement" are often used interchangeably and mean motion or movement that is capable of being detected by a motion sensor or motion sensing component within an active zone of the sensor such as a sensing area or volume of a motion sensor or motion sensing component. Thus, if the sensor is a forward viewing sensor and is capable of sensing motion within a forward extending conical active zone, then movement of anything within that active zone that meets certain threshold detection criteria, will result in a motion sensor output, where the output may include at least direction, velocity, and/or acceleration. Of course, the sensors does not need to have threshold detection criteria, but may simply generate output anytime motion or any nature is detected. The processing units can then determine whether the motion is an actionable motion or movement and a non-actionable motion or movement.

The term "motion sensor" or "motion sensing component" means any sensor or component capable of sensing motion of any kind by anything with an active zone area or volume, regardless of whether the sensor's or component's primary function is motion sensing.

The term "real object" or "real world object" means any real world device or article that is capable of being controlled by a processing unit. Real objects include objects or articles that have real world presence including physical, mechanical, electro-mechanical, magnetic, electro-magnetic, electrical, or electronic devices or any other real world device that can be controlled by a processing unit.

The term "virtual object" means any construct generated in a virtual world or by a computer and displayed by a display device and that are capable of being controlled by a processing unit. Virtual objects include objects that have no real world presence, but are still controllable by a processing unit. These objects include elements within a software system, product or program such as icons, list elements, menu elements, generated graphic objects, 2D and 3D graphic images or objects, generated real world objects such as generated people, generated animals, generated devices, generated plants, generated landscapes and landscape objects, generate seascapes and seascape objects, generated skyscapes or skyscape objects, or any other generated real world or imaginary objects. Haptic, audible, and other attributes may be associated with these virtual objects in order to make them more like "real" objects.

The term "entity" means a human or an animal.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real world object under the control of a human or an animal, or robotics under the control of a system, computer or software system or systems, or autonomously controlled (including with artificial intelligence), and include such articles as pointers, sticks, mobile devices, or any other real world object or virtual object representing a real entity object that can be directly or indirectly controlled by a human or animal or robot or robotic system.

The term "at least one" means one or more or one or a plurality, additionally, these three terms may be used interchangeably within this application. For example, at least one device means one or more devices or one device and a plurality of devices.

The term "motion sensor" means any sensor capable of sensing motion directing or having a component capable of sensing motion.

DETAILED DESCRIPTION OF THE INVENTION

The inventor has found that apparatuses and systems can be developed for the control of real and virtual objects by using sensed linear and/or angular motion, linear and/or angular velocity, linear and/or angular acceleration, changes in linear and/or angular motion, changes in linear and/or angular velocity, changes in linear and/or angular acceleration. The inventor has found that multiple inputs may produce different combinations of output commands, where differences in the velocity or acceleration of each input, or differences in combinations of rates of change from multiple inputs or sensed linear and/or angular motion, linear and/or angular velocity, linear and/or angular acceleration, changes in linear and/or angular motion, changes in linear and/or angular velocity, changes in linear and/or angular acceleration produce different output commands. Thus, the same output command could be reached through multiple different input combinations. The inventor has found that apparatuses may be constructed to control real and/or virtual objects such as electrical devices, appliances, software programs, software routines, software objects, or other real or virtual objects, where the apparatuses may include (1) at least one motion sensor capable of sensing movement or motion within at least one sensing zone of the at least one motion sensor and at least one processing unit for receiving sensor output or (2) at least one combination sensor/processing unit or (3) any combination of these, or any device that combines these components into a single device, where the processing unit converts sensor output into command and control function for controlling at least one real and/or virtual object or a plurality of real and/or virtual objects. The movement or motion includes linear and/or angular motion, linear and/or angular velocity, linear and/or angular acceleration, changes in linear and/or angular motion, changes in linear and/or angular velocity, changes linear and/or angular acceleration, rates of change in direction, rates of change in linear and/or angular velocity, rates of change of linear and/or angular acceleration, and/or mixtures or combinations thereof. The apparatuses may also include a user interface for animal and/or human interaction. The apparatuses may also include remote control devices, where the remote control devices act as the motion sensor or motion sensor and processing unit of the application.

Embodiments of the present invention broadly relate to control systems for controlling real and/or virtual objects such as electrical devices, appliances, software programs, software routines, software objects, or other real or virtual objects, where the systems include at least one motion sensor, at least one processing unit or a sensor/processing combined unit, and optionally at least one user interface. The motion sensors detect movement within sensing zones, areas, and/or volumes and produce output signals of the sensed movement. The processing units receive the output signals and convert the output signals into control and/or command functions for controlling one real and/or virtual object or a plurality of real and/or virtual objects. The control functions include scroll functions, select functions, attribute functions, simultaneous select and scroll functions, simultaneous select and activate functions, simultaneous select and attribute activate functions, simultaneous select and attribute control functions, simultaneous select, activate, and attribute control functions, and mixtures or combination thereof. The systems may also include remote control units. The systems of this invention may also include security units and associated software such as finger print readers, hand print readers, biometric reader, bio-kinetic readers, biomedical readers, retinal readers, voice recognition devices, other electronic security systems, key locks, any other type of mechanical locking mechanism, or mixtures or combinations thereof. Such security devices may include separate sensors or may use the motion sensors. Thus, an active pad sensor may be used not only to sense motion, but may also be able to process a finger print or hand print image, or bio-kinetic print, image or pattern, while an optical sensor may also support a retinal scan function. The term "bio-kinetic" means that the movement of a user is specific to that user, especially when considering the shape of the hand, fingers, or body parts used by the motion sensor to detect movement, and the unique EMF, optical, acoustic, and/or any other wave interference patterns associated with the biology and movement of the user.

Embodiments of the present invention broadly relate to at least one user interface to allow the system to interact with an animal and/or a human and/or robot or robotic systems based on sensed motion.

Embodiments of the present invention broadly relate to control systems for controlling real and/or virtual objects such as electrical devices, appliances, software programs, software routines, software objects, sensors, projected objects, or other real or virtual objects, where the systems includes at least one motion sensor, at least one processing unit, and at least one user interface. The motion sensors detect movement or motion within one or a plurality of sensing zones, areas, and/or volumes associated with the sensors, and the motion sensors produce output signals of the sensed movement. The processing units receive output signals from the motion sensors and convert the output signals into control and/or command functions for controlling one real and/or virtual object or a plurality of real and/or virtual objects. Of course, the motion sensors and processing units may be combined into single units sometimes referred to as sensor/processing units. The control and/or command functions include scroll functions, select functions, attribute functions, simultaneous select and scroll functions, simultaneous select and activate functions, simultaneous select and attribute activate functions, simultaneous select and attribute control functions, simultaneous select, activate functions and attribute control functions, simultaneous activate and attribute control functions or any combination thereof. The systems may also include remote units. The systems of this invention may also include security units and associated software such as finger print readers, hand print readers, biometric readers, bio-kinetic readers, biomedical readers, EMF detection units, optical detection units, acoustic detection units, audible detection units, or other type of wave form readers, retinal readers, voice recognition devices, other electronic security systems, key locks, any other type of mechanical locking mechanism, or mixtures or combinations thereof. Such security devices may include separate sensors or may use the motion sensors. Thus, an active pad sensor may be used not only to sense motion, but also to able to process a finger print or hand print image, while an optical sensor may also support a retinal scan function, or an acoustic sensor may be able to detect the motions as well as voice commands, or a combination thereof.

Embodiments of the present invention broadly relate to control systems for real and/or virtual objects such as electrical devices, appliances, software programs, software routines, software objects, or other real or virtual objects, where the systems includes at least one remote control device including at least one motion sensor, at least one processing unit, and at least one user interface, or a unit or units that provide these functions. The motion sensor(s) detect movement or motion within sensing zones, areas, and/or volumes and produce output signals of the sensed movement or motion. The processing units receive output signals from the sensors and convert the output signals into control and/or command functions for controlling one real and/or virtual object or a plurality of real and/or virtual objects. The control and/or command functions include scroll functions, select functions, attribute functions, simultaneous select and scroll functions, simultaneous select and activate functions, simultaneous select and attribute activate functions, simultaneous select and attribute control functions, simultaneous select, activate functions and attribute control functions, and/or simultaneous activate and attribute control functions or any combination thereof. The systems may also include remote units. The system of this invention may also include security units and associated software such as finger print readers, hand print readers, biometric readers, bio-kinetic readers, biomedical readers, EMF detection units, optical detection units, acoustic detection units, audible detection units, or other type of wave form readers, retinal readers, voice recognition devices, other electronic security systems, key locks, any other type of mechanical locking mechanism, or mixtures or combinations thereof. Such security devices may include separate sensors or may use the motion sensors. Thus, an active pad sensor may be used not only to sense motion, but also to able to process a finger print or hand print image, while an optical sensor may also support a retinal scan function.

The systems of this invention allow users to control real and/or virtual objects such as electrical devices, appliances, software programs, software routines, software objects, sensors, or other real or virtual objects based solely on movement detected with the motion sensing zones of the motion sensors without invoking any hard selection protocol, such as a mouse click or double click, touch or double touch of a pad, or any other hard selection process. The systems simply track movement or motion in the sensing zone, converting the sensed movement or motion into output signals that are processed into command and/or control function(s) for controlling devices, appliances, software programs, and/or real or virtual objects. The motion sensors and/or processing units are capable of discerning attributes of the sensed motion including direction, velocity, and/or acceleration, sensed changes in direction, velocity, and/or acceleration, or rates of change in direction, velocity, and/or acceleration. These attributes generally only trigger a command and/or control function, if the sensed motion satisfies software thresholds for movement or motion direction, movement or motion velocity, movement or motion acceleration and/or changes in movement direction, velocity, and/or acceleration and/or rates of change in direction, rates of change in linear and/or angular velocity, rates of change of linear and/or angular acceleration, and/or mixtures or combinations thereof. Although the movement or motion may be in any direction, have any velocity, and/or have any acceleration within the sensing zones, changes in direction, velocity, and/or acceleration of movement or motion are subject to the motion sensors and/or processing unit's ability to discriminate there between. The discrimination criteria may be no discrimination (all motion generates an output signal), may be preset, may be manually adjusted or may be automatically adjust depending on the sensing zones, the type of motion being sensed, the surrounding (noise, interference, ambient light, temperature, sound changes, etc.), or other conditions that could affect the motion sensors and/or the processing unit by design or inadvertently. Thus, when a user or robot or robotic system moves, moves a body part, moves a sensor or sensor/processing unit or moves an object under user control within one or more sensing zones, the movement and attributes thereof including at least direction, linear and/or angular velocity, linear and/or angular acceleration and/or changes in direction, linear and/or angular velocity, and/or linear and/or angular acceleration including stops and times holds are sensed. The sensed movement or motion is then converted by the processing units into command and control function as set forth above.

Embodiments of the systems of this invention include motion sensors that are capable of detecting movement or motion in one dimension, two dimensions, and/or three dimensions including over time and in different conditions. For example, the motion sensors may be capable of detecting motion in x, y, and/or z axes or equivalent systems such as volumes in a space, volumes in a liquid, volumes in a gas, cylindrical coordinates, spherical coordinates, radial coordinates, and/or any other coordinate system for detecting movement in three directions, or along vectors or other motion paths. The motion sensors are also capable of determining changes in movement or motions in one dimension (velocity and/or acceleration), two dimension (direction, area, velocity and/or acceleration), and/or three dimension (direction, area, volume, velocity and/or acceleration). The sensors may also be capable of determining different motions over different time spans and areas/volumes of space, combinations of inputs such as audible, tactile, environmental and other waveforms, and combinations thereof. The changes in movement may be changes in direction, changes in velocity, changes in acceleration and/or mixtures of changes in direction, changes in velocity or changes in acceleration and/or rates of change in direction, rates of change in velocity, rates of change of acceleration, and/or mixtures or combinations thereof, including from multiple motion sensors, sensors with motion sensing ability, or multiple sensor outputs, where the velocity and/or acceleration may be linear, angular or mixtures and combinations thereof, especially when movement or motion is detected by two or more motion sensors or two or more sensor outputs. The movement or motion detected by the sensor(s) is(are) used by one or move processing units to convert the sensed motion into appropriate command and control functions as set forth herein.

In certain embodiments, the systems of this invention may also include security detectors and security software to limit access to motion detector output(s), the processing unit(s), and/or the real or virtual object(s) under the control of the processing unit(s). In other embodiments, the systems of this invention include wireless receivers and/or transceivers capable of determining all or part of the controllable real and/or virtual objects within the range of the receivers and/or transceivers in the system. Thus, the systems are capable of polling a zone to determine numbers and types of all controllable objects within the scanning zone of the receivers and/or transceivers associated with the systems. Thus, if the systems are portable, the systems will poll their surroundings in order to determine the numbers and types of controllable objects, where the polling may be continuous, periodic, and/or intermittent. These objects, whether virtual or real, may also be used as a sensor array, creating a dynamic sensor for the user to control these and other real and/or virtual objects. The motion sensors are capable of sensing movement of a body (e.g., animal or human), a part of an animal or human (e.g., legs, arms, hands, fingers, feet, toes, eyes, mouth, etc.), and/or an object under control of an animal or human (wands, lights, sticks, phones, mobile devices, wheel chairs, canes, laser pointers, etc.), and robots and/or robotic systems that take the place of animals or humans. Another example of this would be to sense if multiple objects, such as people in a public assembly change their rate of walking (a change of acceleration or velocity is sensed) in an egress corridor, thus, indicating a panic situation, whereby additional egress doors are automatically opened, additional egress directional signage may also be illuminated, and/or voice commands may be activated, with or without other types of sensors being made active.

A timed hold in front of a sensor can be used to activate different functions, e.g., for a sensor on a wall, holding a finger or object briefly in front of sensor causes lights to be adjusted to a preset level, causes TV and/or stereo equipment to be activated, or causes security systems to come on line or be activated, or begins a scroll function through submenus or subroutines. While, continuing to hold, begins a bright/dim cycle that ends, when the hand or other body part is removed. Alternatively, the timed hold causes an attribute value to change, e.g., if the attribute is at its maximum value, a timed hold would cause the attribute value to decrease at a predetermined rate, until the body part or object is removed from or within the active zone. If the attribute value is at its minimum value, then a timed hold would cause the attribute value to increase at a predetermined rate, until the body part or object is removed from or within the active zone. If the value is somewhere in the middle, then the software may allow random selection or may select the direction, velocity, acceleration, changes in these motion properties or rates of changes in these motion properties that may allow maximum control. Of course the interface may allow for the direction, velocity, acceleration, changes in these motion properties, or rates of changes of these motion properties to be determined by the initial direction of motion, while the timed hold would continue to change the attribute value until the body part or object is removed from or within the active zone. A stoppage of motion may be included, such as in the example of a user using a scroll wheel motion with a body part, whereby a list is scrolled through on a display. Once a stoppage of circular motion occurs, a linear scroll function begins, and remains so until a circular motion begins, at which point a circular scroll function remains in effect until stoppage of this kind of motion occurs. In this way, a change of direction, and/or a change of speed (change in acceleration) alone has caused a change in selection of control functions and/or attribute controls. In the circular scroll function, an increase in acceleration might cause the list to not only accelerate in the scroll speed, but also cause the font size to appear smaller, while a decrease in acceleration might cause the scroll speed to decelerate and the font size to increase. Another example might be that as a user moves towards a virtual or real object, the object would move towards the user based upon the user's rate of acceleration; i.e., as the user moves faster towards the object, the object would move faster towards the user, or would change color based upon the change of speed and/or direction of the user. The term "brief" or "briefly" means that the timed hold or cessation of movement occurs for a period to time of less than a second. In certain embodiments, the term "brief" or "briefly" means for a period of time of less than 2.5 seconds. In other embodiments, the term "brief" or "briefly" means for a period of time of less than 5 seconds. In other embodiments, the term "brief" or "briefly" means for a period of time of less than 7.5 seconds. In other embodiments, the term "brief" or "briefly" means for a period of time of less than 10 seconds. In other embodiments, the term "brief" or "briefly" means for a period of time of less than 15 seconds. In other embodiments, the term "brief" or "briefly" means for a period of time of less than 20 seconds. In other embodiments, the term "brief" or "briefly" means for a period of time of less than 30 seconds.

All that is required in order for the systems of the invention of operate properly is that the software must be able to determine when to transition from one command format, such as scrolling through a list to selecting a member from the list has occurred due to a change in a direction, velocity, or acceleration of motion, changes in these motion properties, and/or rates of changes of these motion properties sensed by the systems. Thus, the difference in the direction, velocity, acceleration, and/or changes thereof and/or rates of changes thereof must be sufficient to allow the software to make such a determination (i.e., a discernible change in motion direction, velocity, and/or acceleration), without frustrating the user because the direction, velocity, and/or acceleration change routines do not permit sufficient angular deviation from a given direction before changing from one command format to another, i.e., changing from a list scroll function to a select and attribute value adjustment function associated with a member of the list. Although the angle deviation can be any value, the value is may be about ±1° from the initial direction or about ±2.5° from the initial direction or about ±5° from the initial direction, or about ±10° from the initial direction or about ±15° from the initial direction. For systems set to run on orthogonal directions, e.g., x and y or x, y and z, the deviation can be as great as about ±45° or about ±35° or about ±25° or about ±15° or about ±5° or about ±2.5° or about ±1°. Alternatively, movement in a given direction within an angle deviation of ±x° will result in the control of a single device, while movement in a direction half way between two devices within an angle deviation of ±x° will result in the control of both devices, where the magnitude of value change may be the same or less than that for a single device and where the value of x will depend on the number of device directions active, but will preferably be less than or equal to ¼ of the angle separating adjacent devices. For example, if four devices are located at +x, −x, +y and −y from a center of the an active sensing zone, movement in a 45° angle relative to +x and +y would adjust the attribute of both the +x and +y device simultaneously, at a single device rate or at half a single device rate or at any other predetermined rate of attribute value change, or all four devices may be decreased or increased collectively and proportionately to the distance from the user's coordinates(s) and the change in direction coupled with velocity, acceleration, changes in these motion properties, and/or rates of changes in these motion properties. In another example, changes in speed of one cm per second, or combinations of speed change and angular changes as described above will provide enough change in acceleration that the output command or control of the object(s) will occur as desired. The systems of the present inventions may also include gesture processing. For example, the systems of this invention will be able to sense a start pose, a motion, and an end pose, where the sensed gesture may be referenced to a list of gestures stored in a look-up table. It should be noted that a gesture in the form of this invention may contain all the elements listed herein (i.e., any motion or movement, changes in direction of motion or movement, velocity and/or acceleration of the motion or movement) and may also include the sensing of a change of in any of these motion properties to provide a different output based upon differences in the motion properties associated with a given gesture. For example, if the pattern of motion incorporated in the gesture, say the moving of a fist or pointed finger in a circular clock-wise direction causes a command of "choose all" or "play all" from a list of objects to be issues, speeding up the circular motion of the hand or finger while making the circular motion (increases in angular motion velocity or acceleration) may provide a different command to be issued, such as "choose all but increase the lighting magnitude as well" or "play all but play in a different order". In this way, a change of linear and/or angular velocity and/or acceleration could be used as a gestural command or a series of gestures, as well as a motion-based commands where selections, controls and commands are given when a change in motion properties are made, or where any combination of gestures and motions of these is made.

For purposes of measuring acceleration or changes in velocity, an accelerometer may be used. An accelerometer is a device that measures "proper acceleration". Proper acceleration is physical acceleration (i.e., measurable acceleration as by an accelerometer) experienced by an object and is the acceleration felt by occupants associated with an accelerating object, and which is described as a G-force, which is not a force, but rather an acceleration. For the purposes of this invention, an accelerometer, therefore, is a device that measures acceleration and changes in acceleration by any means.

Velocity and acceleration are vector quantities, consisting of magnitude (amount) and direction. Acceleration is typically thought of as a change in velocity, when the direction of velocity remains the same. However, acceleration also occurs when the velocity is constant, but the direction of the velocity changes, such as when a car makes a turn or a satellite orbits the earth. If a car's velocity remains constant, but the radius is continuously reduced in a turn, the force resulting from the acceleration increases. This force is called G-force. Acceleration rate may change, such as when a satellite keeps its same orbit with reference to the earth, but increases or decreases its speed along that orbit in order to be moved to a different location at a different time.

Typically, acceleration is expressed mathematically by $a=dv/dt$ or $a=d^2x/dt^2$—a change of velocity with respect to time, while velocity is express mathematically by $v=dx/dt$—a change in distance with respect to time. If a motion sensor is capable of sensing velocity and/or acceleration, then the output of such a device, which may be used for command and control function generation and determination, would include sampling to measure units of average velocity and/or accelerations over a given time or as close to instantaneous velocity and/or accelerations as possible. These changes may also be used for command and control function generation and determination including all acceptable command and control functions. It should be noted that average or instantaneous accelerations or velocities may be used to determine states or rates of change of motion, or may be used to provide multiple or different attribute or command functions concurrently or in a compounded manner. These capabilities are more simply visualized by saying when an acceleration value, as measured by an accelerometer, is sensed, a command may be issued, either in real time, or as an average of change over time (avg da/dt), or as an "acceleration gesture" where an acceleration has been sensed and incorporated into the table values relevant to pose-movement-pose then look-up table value recognized and command sent, as is the way gestures are defined. Gestures are currently defined as pose, then a movement, then a pose as measured over a given time, which is then paired with a look-up table to see if the values match, and if they do, a command is issued. A velocity gesture and an acceleration gesture would include the ability to incorporate velocity or changes in velocity or acceleration or changes in acceleration as sensed and identified between the poses, offering a much more powerful and natural identifier of gestures, as well as a more secure gesture where desired. In fact, the addition of changes in motion properties during a gesture can be used to greatly expand the number of gesture and the richness of gesture processing and on-the-fly gesture modification during processing so that the look-up table would identify the "basic" gesture type and the system would then invoke routines to augment the basic response in a pre-determined or adaptive manner.

Embodiments of this invention relate to methods that are capable of measuring a person, a person's body part(s), or object(s) under the control of a person moving in a continuous direction, but undergoing a change in velocity in such a manner that a sensor is capable of discerning the change in velocity represented by $\Delta v$ or $dv$ or acc. Once a change in velocity is sensed by the sensor, the sensor output is forwarded to a processing unit that issues a command function in response to the sensor output, where the command function comprises functions previously disclosed. These process may occur simultaneously where capabilities to do so exist, such as with the capabilities of Quantum Processors. The communication may be wired or wireless, if wired, the communication may be electrical, optical, sonic, or the like, if the communication is wireless, the communication may be: 1) light, light waveforms, or pulsed light transmissions such as Rf, microwave, infra-red (IR), visible, ultra-violet, or other light communication formats, 2) acoustic, audile, sonic, or acoustic waveforms such as ultrasound or other sonic communication formats, or 3) any other type of wireless communication format. The processing unit includes an object list having an object identifier for each object and an object specific attribute list for each object having one or a plurality of attributes, where each object specific attribute has an attribute identifier.

The systems and methods are disclosed herein where command functions for selection and/or control of real and/or virtual objects may be generated based on a change in velocity at constant direction, a change in direction at constant velocity, a change in both direction and velocity, a change in a rate of velocity, or a change in a rate of acceleration. Once detected by an detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or real world games, light moving ahead of a runner, but staying with a walker, or any other motion having compound properties such as direction, velocity, acceleration, and changes in any one or all of these primary properties; thus, direction, velocity, and acceleration may be considered primary motion properties, while changes in these primary properties may be considered secondary motion properties. The system may then be capable of differentially handling of primary and secondary motion properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion properties may expand or contract the selection format.

In another example of this primary/secondary format for causing the system to generate command functions may involve an object display. Thus, by moving the object in a direction away from the user's eyes, the state of the display may change, such as from a graphic to a combination graphic and text, to a text display only, while moving side to side or moving a finger or eyes from side to side could scroll the displayed objects or change the font or graphic size, while moving the head to a different position in space might reveal or control attributes or submenus of the object. Thus, these changes in motions may be discrete, compounded, or include changes in velocity, acceleration and rates of these changes to provide different results for the user. These examples illustrate two concepts: 1) the ability to have compound motions which provide different results that the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present invention while based on the use of sensed velocity, acceleration, and changes and rates of changes in these properties to effect control of real world objects and/or virtual objects, the present invention may also use other properties of the sensed motion in combination with sensed velocity, acceleration, and changes in these properties to effect control of real world and/or virtual objects, where the other properties include direction and change in direction of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, real world object under the control of a human or animal, or robots under control of the human or animal, then sensing motion of a second body part may be used to confirm primary selection protocols or may be used to fine tune the selected command and control function. Thus, if the selection is for a group of objects, then the secondary motion properties may be used to differentially control object attributes to achieve a desired final state of the objects.

For example, suppose the apparatuses of this invention control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights has been selected from the menu, movement to the right would select and activate the lights on the right wall. Movement straight down would turn all of the lights of the right wall down—dim the lights. Movement straight up would turn all of the lights on the right wall up—brighten. The velocity of the movement down or up would control the rate that the lights were dimmed or brighten. Stopping movement would stop the adjustment or removing the body, body part or object under the user control within the motion sensing area would stop the adjustment.

For even more sophisticated control using motion properties, the user may move within the motion sensor active area to map out a downward concave arc, which would cause the lights on the right wall to dim proportionally to the arc distance from the lights. Thus, the right lights would be more dimmed in the center of the wall and less dimmed toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity—acceleration—further refinements of the lighting configuration may be obtained.

Now suppose that all the lights in the room have been selected, then circular or spiral motion would permit the user to adjust all of the lights, with direction, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone—area and especially volume, a user can use simple or complex motion to differentially control large numbers of devices simultaneously.

This differential control through the use of sensed complex motion permits a user to nearly instantaneously change lighting configurations, sound configurations, TV configurations, or any configuration of systems having a plurality of devices being simultaneously controlled or of a single system having a plurality of objects or attributes capable of simultaneous control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

Embodiments of systems of this invention include a motion sensor or sensor array, where each sensor includes an active zone and where each sensor senses movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects and produces an output signal. The systems also include at least one processing unit including communication software and hardware, where the processing units convert the output signal or signals from the motion sensor or sensors into command and control functions, and one or a plurality of real objects and/or virtual objects in communication with the processing units. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. The processing unit or units (1) processes a scroll function or a plurality of scroll functions, (2) selects and processes a scroll function or a plurality of scroll functions, (3) selects and activates an object or a plurality of objects in communication with the processing unit, or (4) selects and activates an attribute or a plurality of attributes associated with an object or a plurality of objects in communication with the processing unit or units, or any combination thereof. The objects comprise electrical devices, electrical systems, sensors, hardware devices, hardware systems, environmental devices and systems, energy and energy distribution devices and systems, software systems, software programs, software objects, or combinations thereof. The attributes comprise adjustable attributes associated with the devices, systems, programs and/or objects. In certain embodiments, the sensor(s) is(are) capable of discerning a change in movement, velocity and/or acceleration of ±5%. In other embodiments, the sensor(s) is(are) capable of discerning a change in movement, velocity and/or acceleration of ±10°. In other embodiments, the system further comprising a remote control unit or remote control system in communication with the processing unit to provide remote control of the processing unit and all real and/or virtual objects under the control of the processing unit. In other embodiments, the motion sensor is selected from the group consisting of digital cameras, optical scanners, optical roller ball devices, touch pads, inductive pads, capacitive pads, holographic devices, laser tracking devices, thermal devices, touch or touchless sensors, acoustic devices, and any other device capable of sensing motion, arrays of such devices, and mixtures and combinations thereof. In other embodiments, the objects include environmental controls, lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical or manufacturing plant control systems, computer operating systems and other software systems, remote control systems, mobile devices, electrical systems, sensors, hardware devices, hardware systems, environmental devices and systems, energy and energy distribution devices and systems, software programs or objects or mixtures and combinations thereof.

Embodiments of methods of this invention for controlling objects include the step of sensing movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects within an active sensing zone of a motion sensor or within active sensing zones of an array of motion sensors. The methods also include the step of producing an output signal or a plurality of output signals from the sensor or sensors and converting the output signal or signals into a command function or a plurality of command functions. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. In certain embodiments, the objects comprise electrical devices, electrical systems, sensors, hardware devices, hardware systems, environmental devices and systems, energy and energy distribution devices and systems, software systems, software programs, software objects, or combinations thereof. In other embodiments, the attributes comprise adjustable attributes associated with the devices, systems, programs and/or objects. In other embodiments, the timed hold is brief or the brief cessation of movement causing the attribute to be adjusted to a preset level, causing a selection to be made, causing a scroll function to be implemented, or a combination thereof. In other embodiments, the timed hold is continued causing the attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value or scroll function in a direction of the initial motion until the timed hold is removed. In other embodiments, the motion sensor is selected from the group consisting of sensors of any kind including digital cameras, optical scanners, optical roller ball devices, touch pads, inductive pads, capacitive pads, holographic devices, laser tracking devices, thermal devices, touch or touchless sensors, acoustic devices, and any other device capable of sensing motion or changes in any waveform due to motion or arrays of such devices, and mixtures and combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems and other software systems, remote control systems, sensors, or mixtures and combinations thereof.

Embodiments of this invention relate to methods for controlling objects include sensing motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The methods also include producing an output signal or a plurality of output signals corresponding to the sensed motion and converting the output signal or signals via a processing unit in communication with the motion sensor into a command function or a plurality of command functions. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The methods also include processing the command function or the command functions, where to active cause scrolling, selecting, s a scroll function, (2) selecting and processing a scroll function, (3) selecting and activating an object or a plurality of objects in communication with the processing unit, (4) selecting and activating an attribute or a plurality of attributes associated with the object or the plurality of objects in communication with the processing unit, or (5) selecting, activating an object or a plurality of objects in communication with the processing unit, and activating an attribute or a plurality of attributes associated with the object or the plurality of objects in communication with the processing unit.

In certain embodiments, the objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. In other embodiments, the attributes comprise activatable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed.

Embodiments of this invention relate to methods for controlling real world objects include sensing motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The methods also include producing an output signal or a plurality of output signals corresponding to the sensed motion and converting the output signal or signals via a processing unit in communication with the motion sensor into a command function or a plurality of command functions. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The methods also include (1) processing a scroll function, (2) selecting and processing a scroll function, (3) selecting and activating an object or a plurality of objects in communication with the processing unit, (4) selecting and activating an attribute or a plurality of attributes associated with the object or the plurality of objects in communication with the processing unit, or (5) selecting, activating an object or a plurality of objects in communication with the processing unit, and activating an attribute or a plurality of attributes associated with the object or the plurality of objects in communication with the processing unit.

In certain embodiments, the objects comprise real world objects and mixtures or combinations thereof, where the real world objects include physical, mechanical, electro-mechanical, magnetic, electro-magnetic, electrical, or electronic devices or any other real world device that can be controlled by a processing unit or units. In other embodiments, the attributes comprise activatable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, remote control systems, or mixtures and combinations thereof.

Embodiments of this invention relate to methods for controlling virtual objects include sensing motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The methods also include producing an output signal or a plurality of output signals corresponding to the sensed motion and converting the output signal or signals via a processing unit in communication with the motion sensor into a command function or a plurality of command functions. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The methods also include (1) processing a scroll function, (2) selecting and processing a scroll function, (3) selecting and activating an object or a plurality of objects in communication with the processing unit, (4) selecting and activating an attribute or a plurality of attributes associated with the object or the plurality of objects in communication with the processing unit, or (5) selecting, activating an object or a plurality of objects in communication with the processing unit, and activating an attribute or a plurality of attributes associated with the object or the plurality of objects in communication with the processing unit.

In certain embodiments, the objects comprise virtual objects and mixtures or combinations thereof, where the virtual objects include any construct generated in a virtual world or by a computer and displayed by a display device and that are capable of being controlled by a processing unit. In other embodiments, the attributes comprise activatable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In other embodiments, the software products include computer operating systems, graphics systems, business software systems, word processor systems, internet browsers, accounting systems, military systems, control systems, or mixtures and combinations thereof.

Embodiments of this invention relate to systems and apparatuses for controlling objects include one or a plurality of motion sensor including an active zone, where the sensor senses motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof to produce an output signal or a plurality of output signals. The systems and apparatuses also include one or a plurality of processing unit including communication software and hardware, where the processing unit or units convert the outputs into command and control functions, and one or a plurality of controllable objects in communication with the processing unit or units. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The processing unit or units (1) process scroll functions, (2) select and process scroll functions, (3) select and activate one controllable object or a plurality of controllable objects in communication with the processing unit, (4) select and activate one controllable attribute or a plurality of controllable attributes associated with the controllable objects in communication with the processing unit, or (5) select, activate an object or a plurality of objects in communication with the processing unit, and activate an attribute or a plurality of attributes associated with the object or the plurality of objects in communication with the processing unit.

In certain embodiments, the objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. In other embodiments, the attributes comprise activatable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, remote control systems, or mixtures and combinations thereof. In other embodiments, the sensor and/or the processing unit are capable of discerning a change in direction of motion of ±15°. In other embodiments, the sensor and/or the processing unit are capable of discerning a change in direction of motion of ±10°. In other embodiments, the sensor and/or the processing unit are capable of discerning a change in direction of motion of ±5°. In other embodiments, the systems and apparatuses further include a remote control unit in communication with the processing unit to provide remote control of the processing unit and the objects in communication with the processing unit.

Embodiments of this invention relate to systems and apparatuses for controlling real world objects include one or a plurality of motion sensor including an active zone, where the sensor senses motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The systems and apparatuses also include one or a plurality of processing unit including communication software and hardware, where the unit converts the output into command and control functions, and one or a plurality of controllable objects in communication with the processing unit. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The processing unit or units (1) process scroll functions, (2) select and process scroll functions, (3) select and activate one controllable object or a plurality of controllable objects in communication with the processing unit, (4) select and activate one controllable attribute or a plurality of controllable attributes associated with the controllable objects in communication with the processing unit, or (5) select, activate an object or a plurality of objects in communication with the processing unit, and activate an attribute or a plurality of attributes associated with the object or the plurality of objects in communication with the processing unit.

In certain embodiments, the objects comprise real world objects and mixtures or combinations thereof, where the real world objects include physical, mechanical, electro-mechanical, magnetic, electro-magnetic, electrical, or electronic devices or any other real world device that can be controlled by a processing unit. In other embodiments, the attributes comprise activatable, executable and/or adjustable attributes associated with the objects. In other embodiments, changes in motion properties are changes discernible by the motion sensors and/or the processing units. In certain embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In certain embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, remote control systems, or mixtures and combinations thereof. In certain embodiments, the sensor and/or the processing unit are capable of discerning a change in direction of motion of ±15°. In certain embodiments, the sensor and/or the processing unit are capable of discerning a change in direction of motion of ±10°. In certain embodiments, the sensor and/or the processing unit are capable of discerning a change in direction of motion of ±5°. In certain embodiments, the methods further include a remote control unit in communication with the processing unit to provide remote control of the processing unit and the objects in communication with the processing unit.

Embodiments of this invention relate to systems and apparatuses for controlling virtual objects include one or a plurality of motion sensor including an active zone, where the sensor senses motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The systems and apparatuses also include one or a plurality of processing unit including communication software and hardware, where the unit converts the output into command and control functions, and one or a plurality of controllable objects in communication with the processing unit or units. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The processing unit or units (1) process scroll functions, (2) select and process scroll functions, (3) select and activate one controllable object or a plurality of controllable objects in communication with the processing unit, (4) select and activate one controllable attribute or a plurality of controllable attributes associated with the controllable objects in communication with the processing unit, or (5) select, activate an object or a plurality of objects in communication with the processing unit, and activate an attribute or a plurality of attributes associated with the object or the plurality of objects in communication with the processing unit.

In certain embodiments, the objects comprise virtual objects and mixtures or combinations thereof, where the virtual objects include any construct generated in a virtual world or by a computer and displayed by a display device and that are capable of being controlled by a processing unit. In other embodiments, the attributes comprise activatable, executable and/or adjustable attributes associated with the objects. In other embodiments, changes in motion properties are changes discernible by the motion sensors and/or the processing units. In other embodiments, the sensor and/or the processing unit are capable of discerning a change in direction of motion of ±15°. In other embodiments, the sensor and/or the processing unit are capable of discerning a change in direction of motion of ±10°. In other embodiments, the sensor and/or the processing unit are capable of discerning a change in direction of motion of ±5°. In other embodiments, systems and apparatuses further include a remote control unit in communication with the processing unit to provide remote control of the processing unit and the objects in communication with the processing unit. In other embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In other embodiments, the software products include computer operating systems, graphics systems, business software systems, word processor systems, internet browsers, accounting systems, military systems, control systems, or mixtures and combinations thereof.

Suitable Components for Use in the Invention

The motion sensors may also be used in conjunction with displays, keyboards, touch pads, touchless pads, sensors of any type, or other devices associated with a computer, a notebook computer or a drawing tablet or any mobile or stationary device. The motion sensors may be optical sensors, acoustic sensors, thermal sensors, optoacoustic sensors, acoustic devices, any other sensor that senses movement or changes in movement, or mixtures or combinations thereof. The sensors may be digital, analog or a combination of digital and analog. For camera systems, the systems may sense motion within a zone, area or volume in front of the lens. Optical sensors may operate in any region of the electromagnetic spectrum including, without limitation, RF, microwave, near IR, IR, far IR, visible, UV or mixtures or combinations thereof. Acoustic sensor may operate over the entire sonic range which includes the human audio range, animal audio ranges, or combinations thereof. EMF sensors may be used and operate in any region of a discernable wavelength or magnitude where motion can be discerned. Moreover, LCD screen(s) may be incorporated to identify which devices are chosen or the temperature setting, etc. Moreover, the interface may project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors.

Suitable physical mechanical, electro-mechanical, magnetic, electro-magnetic, electrical, or electronic devices, hardware devices, appliances, and/or any other real world device that can be controlled by a processing unit include, without limitation, any electrical and/or hardware device or appliance having attributes which can be controlled by a switch, a joy stick or similar type controller, or software program or object. Exemplary examples of such attributes include, without limitation, ON, OFF, intensity and/or amplitude, impedance, capacitance, inductance, software attributes, lists or submenus of software programs or objects, or any other controllable electrical and/or electro-mechanical function and/or attribute of the device. Exemplary examples of devices include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, air conditioning systems (air conditions and heaters), energy management systems, medical devices, vehicles, robots, robotic control systems, UAV, equipment and machinery control systems, hot and cold water supply devices, air conditioning system, heating systems, fuel delivery systems, energy management systems, product delivery systems, ventilation systems, air handling systems, computers and computer systems, chemical plant control systems, manufacturing plant control systems, computer operating systems and other software systems, programs, routines, objects, and/or elements, remote control systems, or the like or mixtures or combinations thereof.

Suitable software systems, software products, and/or software objects that are amenable to control by the interface of this invention include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, databases, software programs and applications, internet browsers, accounting systems, military systems, control systems, or the like, or mixtures or combinations thereof. Software objects generally refer to all components within a software system or product that are controllable by at least one processing unit.

Suitable processing units for use in the present invention include, without limitation, digital processing units (DPUs), analog processing units (APUs), any other technology that can receive motion sensor output and generate command and/or control functions for objects under the control of the processing unit, or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof.

DETAILED DESCRIPTION OF DRAWINGS OF THIS INVENTION

Referring now to FIGS. 1A-H, an embodiment of a motion sensing apparatus of this invention, generally 100, is shown to include a motion sensor 102. The motion sensor 102 has a field of view or active sensing zone 104, shown here as a cone. Within the field of view or active sensing zone 104, motion or movement may be detected or sensed. The apparatus 100 also includes a processing unit 106 in communication via communication path 108 with the motion sensor 102 for receiving output from the motion sensor 102 and generate command and/or control functions.

Looking at FIG. 1A, an arcuate path 110 is shown. Because the path 106 is arcuate, the motion sensor 102 is capable of detecting various components of motion within in the field of view or active sensing zone 104. These components include direction along the path 106, changes in direction along the path 110, velocity along the path 110, changes in the velocity along the path 110, acceleration along the path 110, and changes in acceleration along the path 110. It should be recognized, the velocity and acceleration are vectorial values that have a magnitude and a direction. Thus, the motion sensor 102 may also separately determine the magnitude and direction of the velocity and/or acceleration movement. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically. As stated previously, the velocity or acceleration may be linear, radial (linear from a center), angular (circular, spiral, elliptical, etc.) or arcuate, or any mixture thereof, or of any type that one might use to interface with objects. Random motions may be used for security purposes, where such motions may be duplicated later for unlocking, securing, or providing unique identifiers for users, including using bio-kinetic signatures, where motion and biometrics (such as joint length of two fingers) are used to provide unique identifiers for individuals. In the present invention, the motion sensor(s) may be able to sense movement of multiple body parts or multiple objects in the field of view. Each individual sensed movement corresponding to a velocity, an acceleration, a change of velocity, a change of acceleration, a rate of change of velocity, and/or a rate of change of acceleration, or any collection of movements may be used to cause the processing unit to issue a command and the nature of the command may be based on the movement of multiple body parts or objects.

Figure 1B:
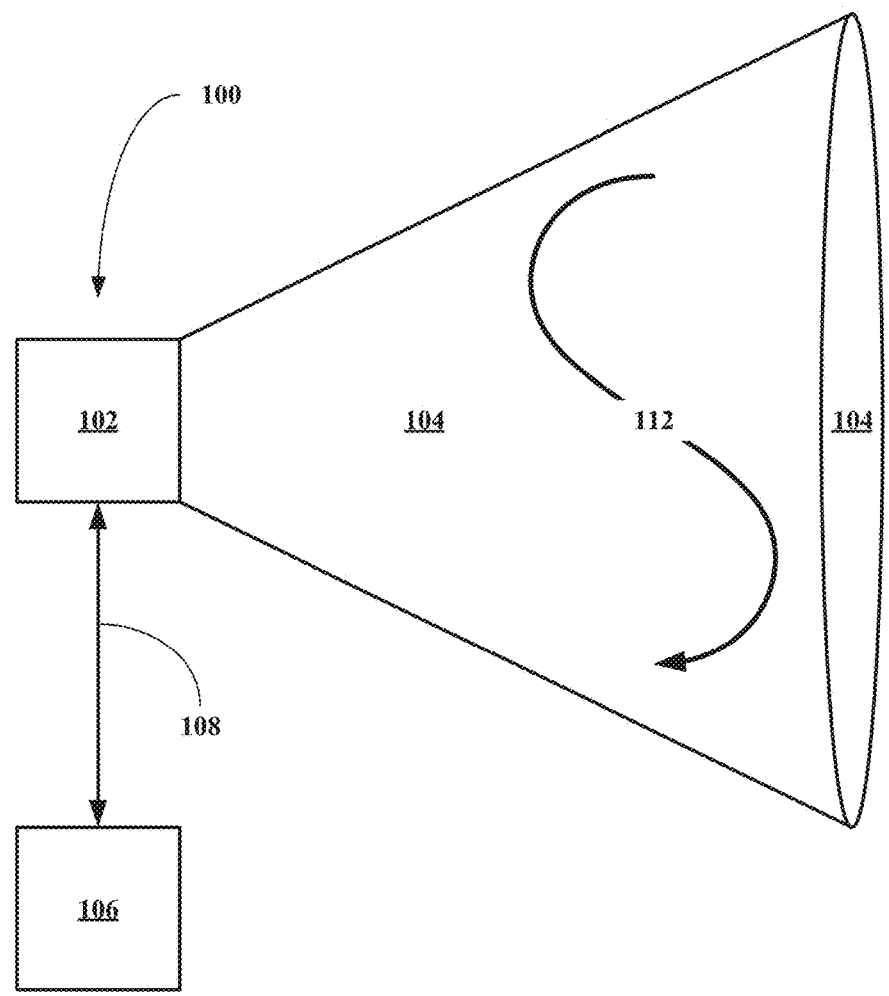
FIG. 1B depicts another embodiment of a system of this invention sensing a sinuous path illustrating complex angular motion.

Looking at FIG. 1B, a path 112 is shown to be S-shaped. Because the path 112 is S-shaped, the motion sensor 102 will detect components of motion including direction, changes in direction, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically.

Figure 1C:
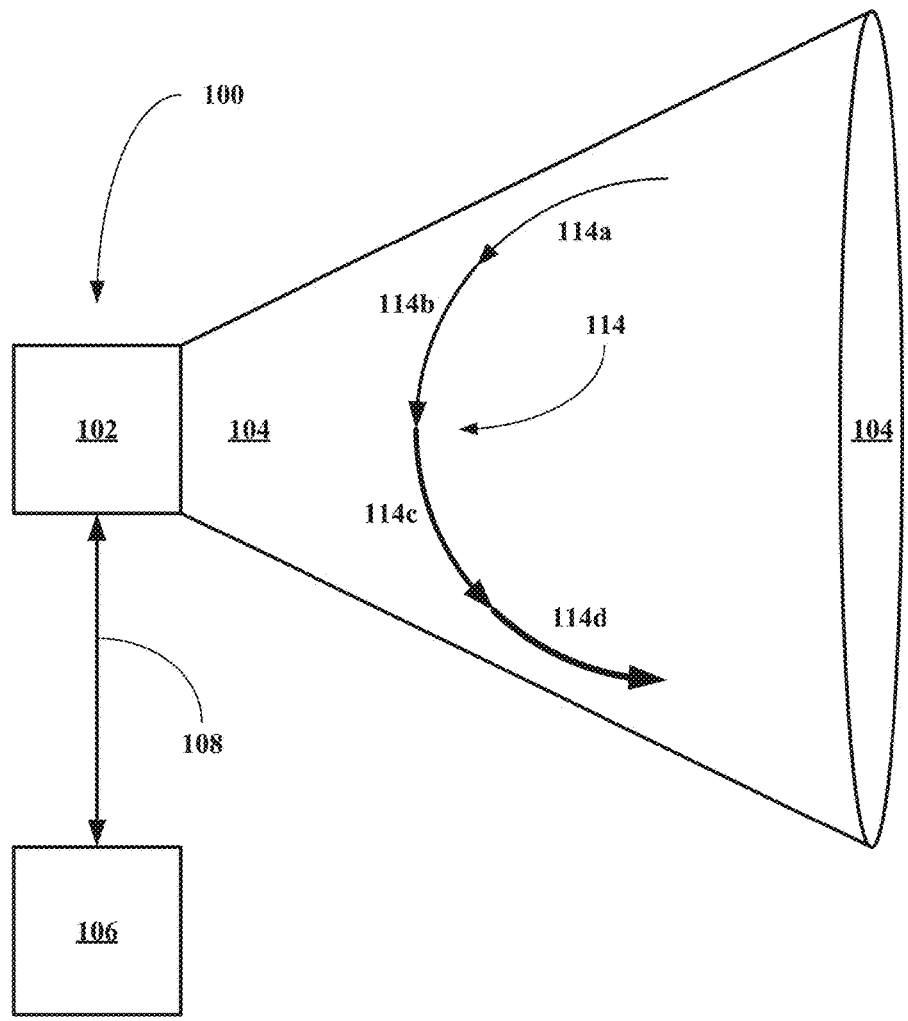
FIG. 1C depicts another embodiment of a system of this invention sensing an arcuate path including segments having different velocities and/or accelerations, but the same direction.

Referring now to FIG. 1C, an arcuate path 114 is shown, where the path 114 includes four segments 114a, 114b, 114c, and 114d. Each segment 114a-d has an increasing velocity and an increasing acceleration as indicated by the thickness of the lines. Because the path 114 is arcuate and includes ever increasing velocities, the motion sensor 102 is capable of detecting direction, changes in direction, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically.

Figure 1D:
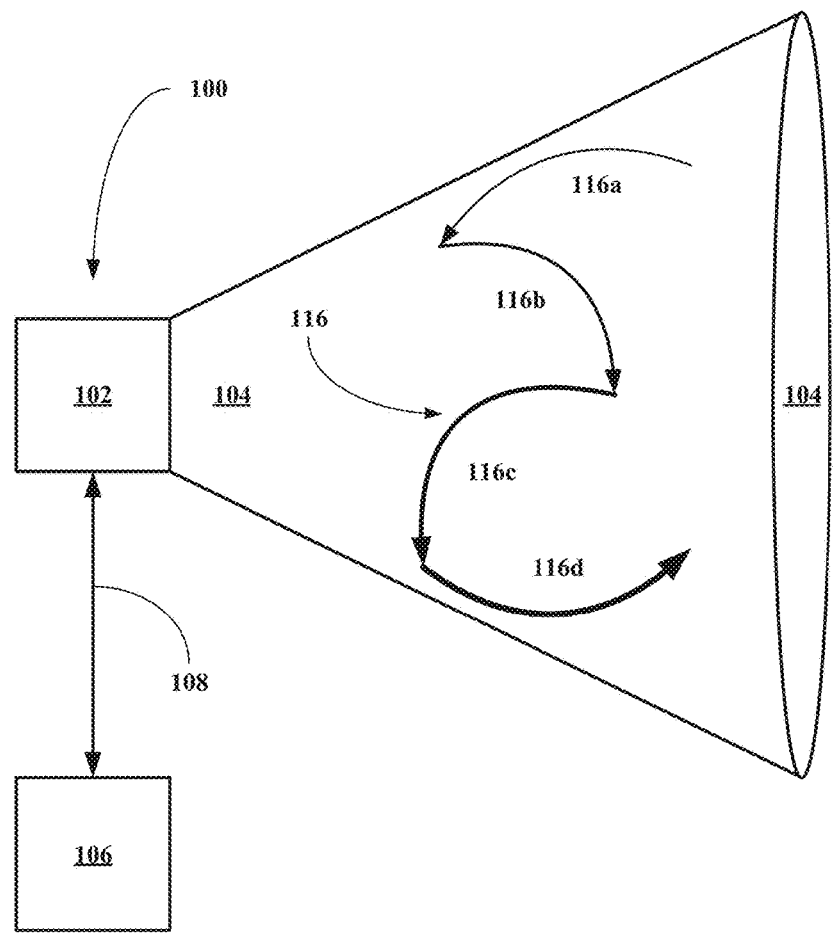
FIG. 1D depicts another embodiment of a system of this invention sensing a sequential path including a plurality of arcuate segments having different directions, velocities, and/or accelerations.

Referring now to FIG. 1D, a complex arcuate path 116 is shown, where the path 116 includes four segments 116a, 116b, 116c, and 116d. Each segment 116a-d has an increasing velocity and an increasing acceleration as indicated by the thickness of the lines, but with different directions as compared to the path 110. Because the path 116 is arcuate and includes ever increasing velocities, the motion sensor 102 is capable of detecting direction, changes in direction, velocity, changes in the velocity, acceleration, and changes in acceleration. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other virtual or real object electrically or electro-mechanically. In other embodiments, the motion represents an acceleration gesture, where the totality of the parts are used to provide an output, and the uniqueness of the gesture is provided by the changes of velocity and/or acceleration within the gesture.

Figure 1E:
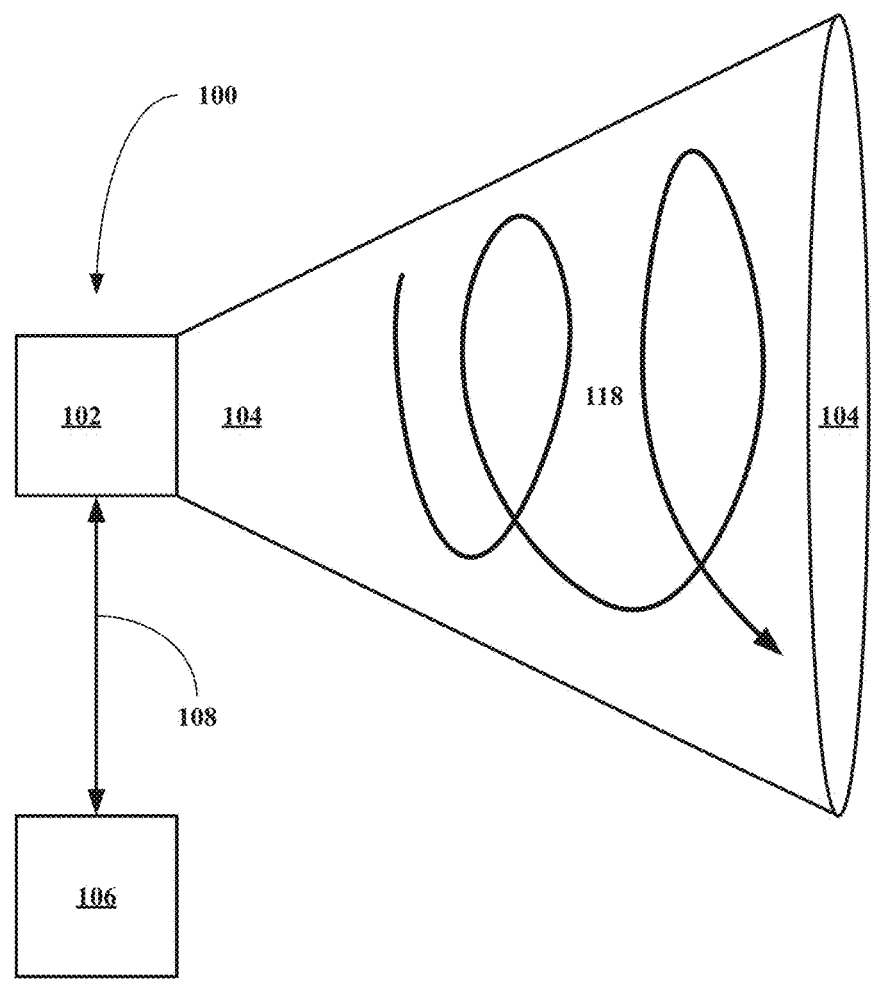
FIG. 1E depicts another embodiment of a system of this invention sensing a spiral path, where the spiral path may have constant or variable velocities, and/or accelerations.

Referring now to FIG. 1E, a spiral motion path 118 is shown. Because the path 118 is spiral shaped, the motion sensor 102 will detect components of motion including direction, changes in direction, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other virtual object, or any other real object such as a electrical objects or electro-mechanical objects.

Figure 1F:
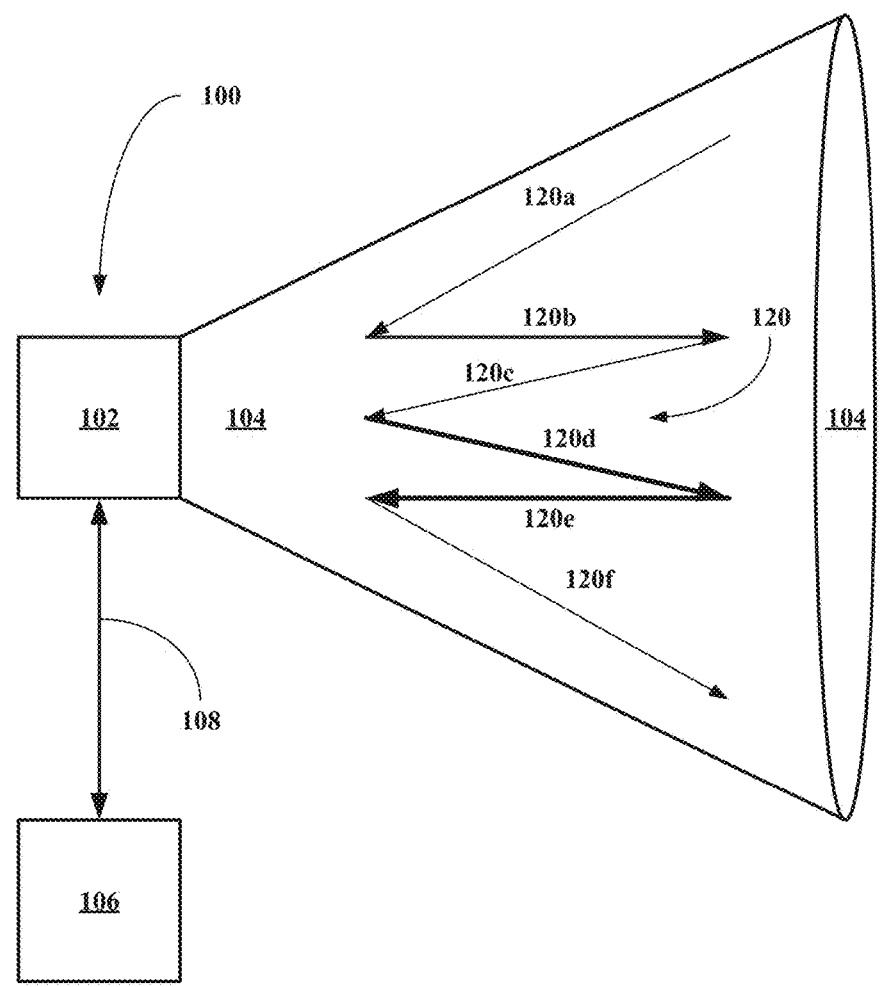
FIG. 1F depicts another embodiment of a system of this invention sensing a sequential path including a plurality of straight segments having different directions with different velocities, and/or accelerations.

Referring now to FIG. 1F, a path 120 is shown, where the path 120 includes six segments 120a, 120b, 120c, 120d, 120e, and 120f. Each segment 120a-f has a different direction and different velocity and/or acceleration as indicated by the thickness of the lines. Because the path 120 includes different segments, the motion sensor 102 is capable of detecting direction, changes in direction, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically.

Figure 1G:
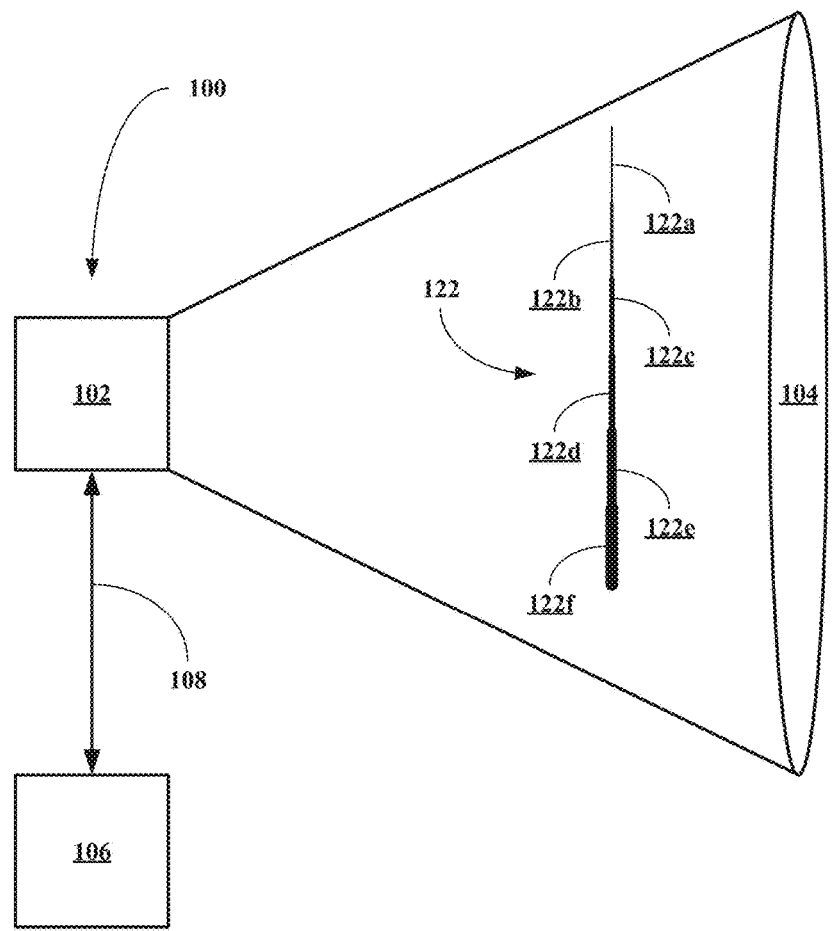
FIG. 1G depicts another embodiment of a system of this invention sensing a straight path having segments having different velocities and/or accelerations, but the same direction.

Referring now to FIG. 1G, a path 122 is shown, where the path 122 includes a sequence of segments 122a, 122b, 122c, 122d, 122e, and 122f having the same direction, but different velocities as indicated by the thickness of the lines. Because the path 122 includes different segments, the motion sensor 102 is capable of detecting the direction and the velocity or the acceleration of the motion direction, changes in the velocity, acceleration, changes in acceleration, rates of velocity changes, and/or rates of acceleration changes. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically, optically, or electro-mechanically, or through any other medium by which commands or information may be communicated. Of course, the path 122 may be a path 122 that has a smooth change in velocity, where the processing unit or sensor or both interpret the path 122 as indicating a constantly changing velocity or acceleration, which may cause the processing unit to issue a command different from a series of segments, each segment having a constant velocity, but different from the previous or later segment.

Figure 1H:
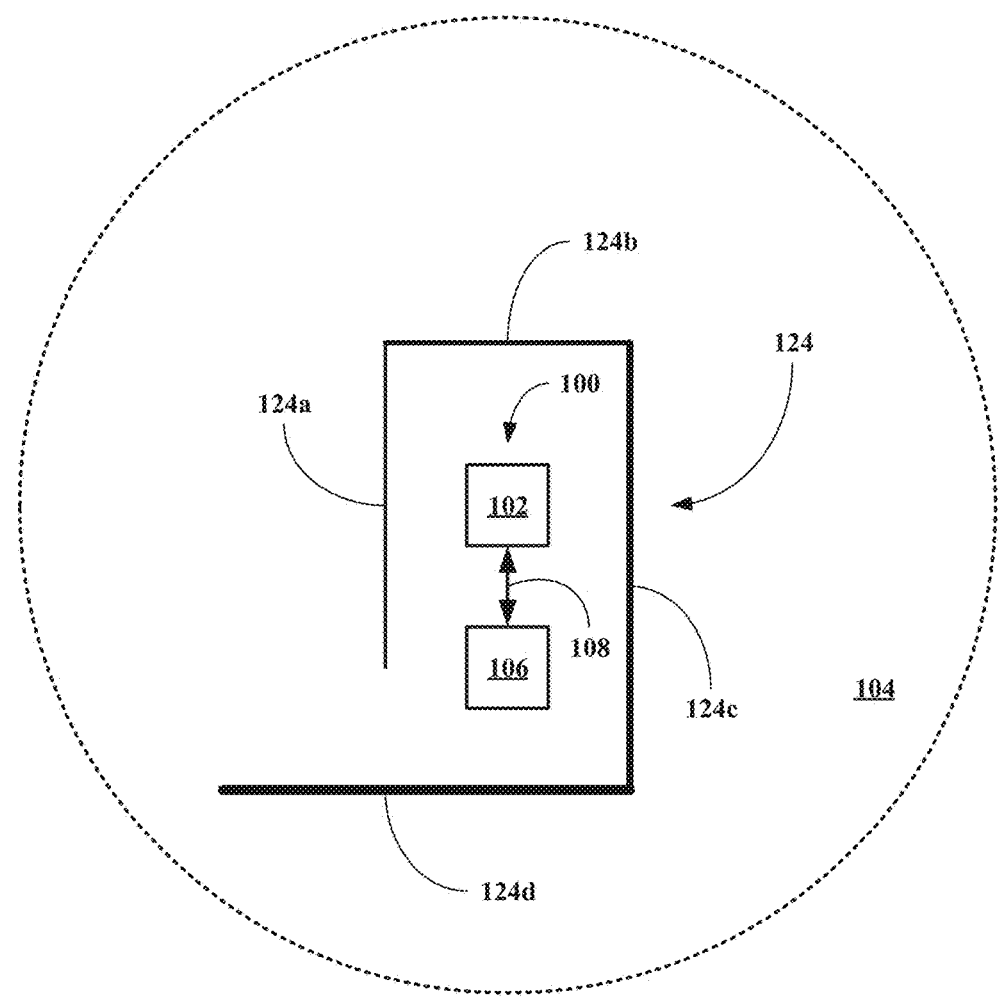
FIG. 1H depicts another embodiment of a system of this invention sensing a gesture including up, right, down and left segments having different directions with different velocities, and/or accelerations.

Referring now to FIG. 1H, a gesture 124 is shown, where the gesture 124 includes a sequence of segments 124a, 124b, 124c, and 124d having the different directions, different velocities, and/or different accelerations, illustrated by different line thicknesses. While the gesture 124 here is shown to include segments 124a-d that increase in velocity and/or acceleration and change in direction in going from 124a to 124d, the segments 124a-d may have any direction, velocity, and/or acceleration change profile, where each combination of directions, velocities, and/or accelerations may represent a different gesture. Thus, a gesture including motion up, right, down and left may represent a number of different gestures depending upon the velocity and/or acceleration of each segment.

Figure 2:
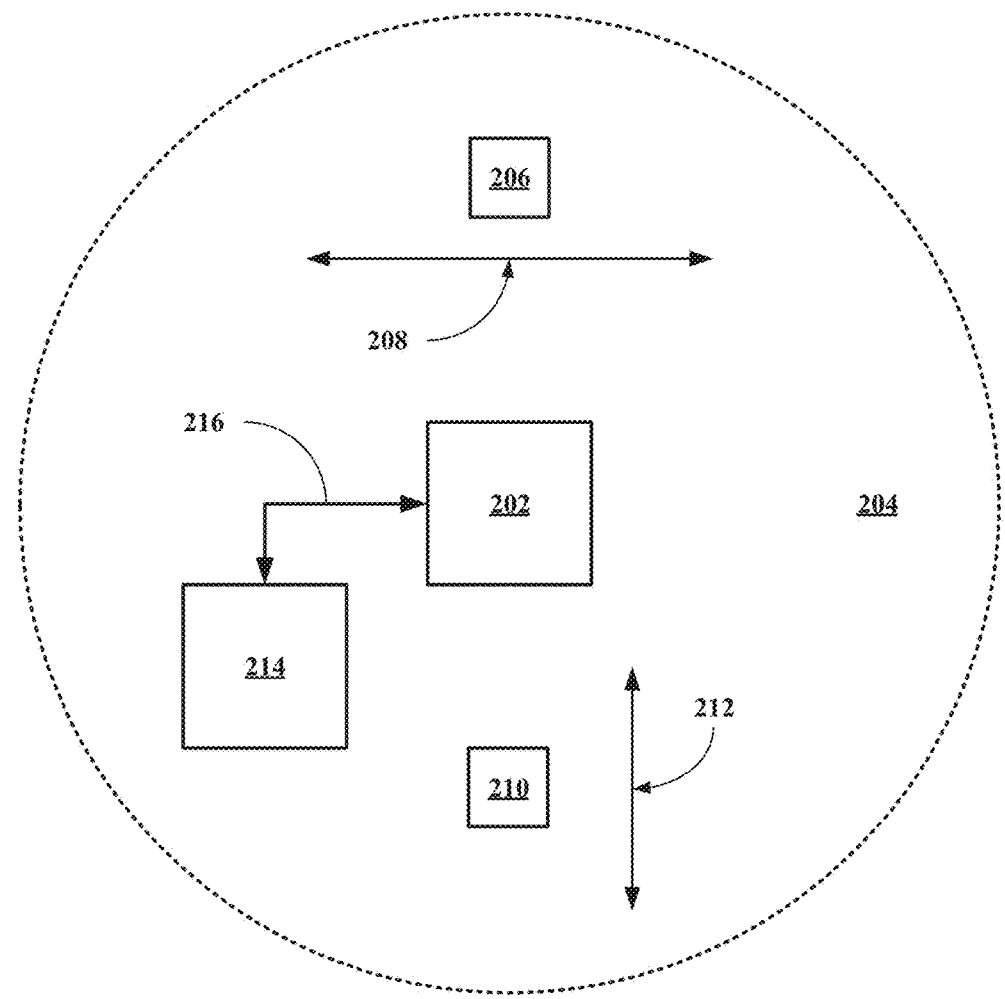
FIG. 2 depicts an embodiment of a system of this invention including a sensor and two separate movements within an active zone in two different directions by two different entity objects.

Referring now to FIG. 2, an embodiment of a motion sensing apparatus of this invention, generally 200, is shown to include a motion sensor 202. The motion sensor 202 has a field of view or active sensing zone 204, shown here as dashed circle. Within the field of view or active sensing zone 204, motion or movement may be detected or sensed as the active zone 204 is either pointing in the +z or −z direction or both the +z and −z directions. As shown in the system 200, a first entity or a first entity object 206 under the control of the first entity in the real world that is sensed by the motion sensor 202 in a first direction 208, here shown as motion is the x-direction. The system 200 also includes a second entity or a second entity object 210 under the control of the second entity in the real world that is sensed by the motion sensor 202 in a second direction 212, here shown as motion is the y-direction. The apparatus 200 also includes a processing unit 214 in communication with the sensor 202 via a communication path 216. While in this figure, the two directions are in the x-direction and y-direction, the two directions do not have to be different nor at right angles to each other. The two sensed motions or movements may result in separate sensor output signals or a combined sensor output signal, where the separate and/or combined sensor output signals are used by the processing unit or units to generate a command and/or control functions as set forth above. One of the separate sensor outputs could be used by the processing unit to generate a command and/or control function, while the second could be used as a confirmation of the function, cause a modification of the function, causes a further specification of the function, or causes the function to be rejected. Thus, the two motions could be separated by a delay so that the second motion would represent a confirmatory motion or a rejection of the selection.

Figure 3A:
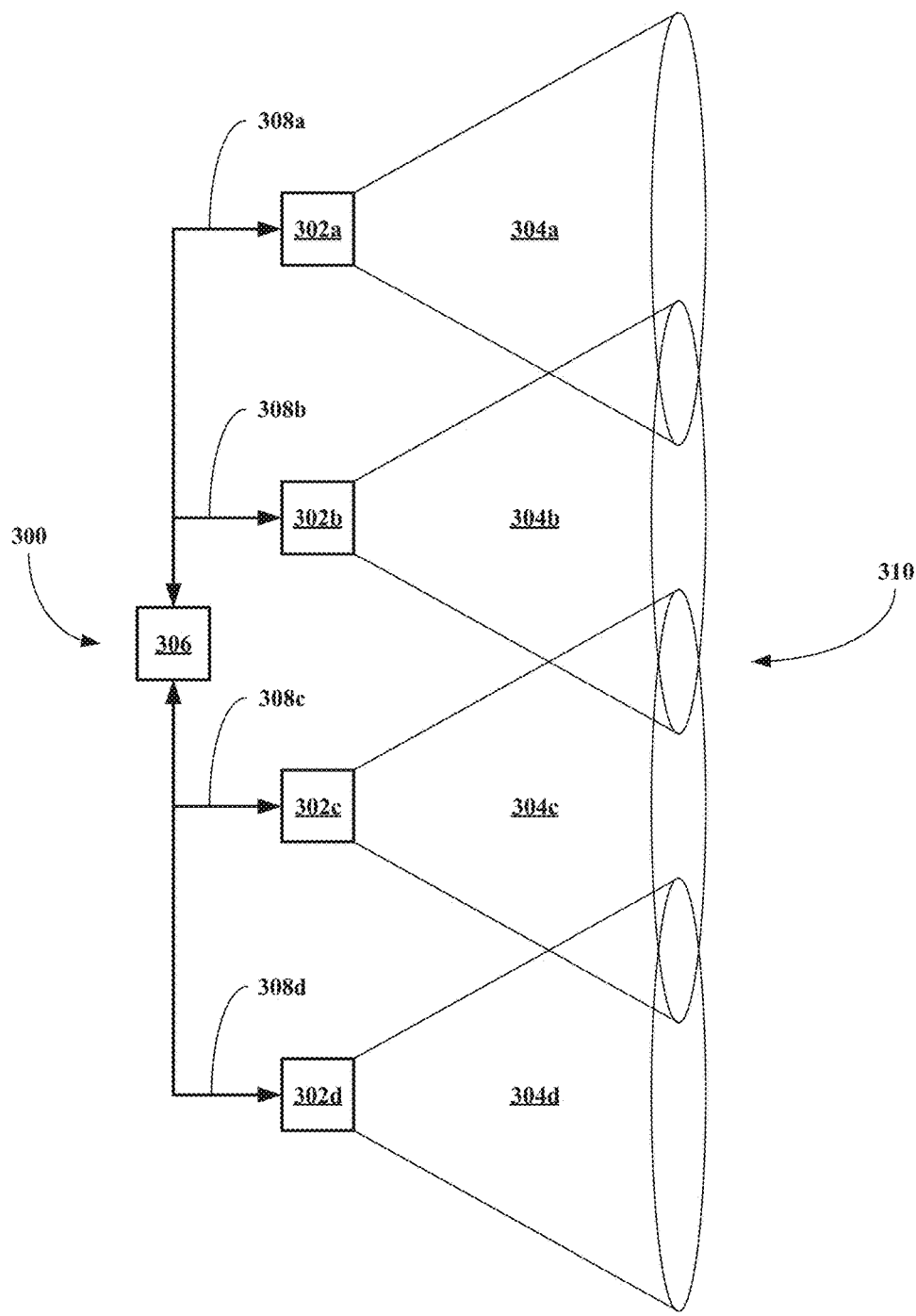
FIG. 3A depicts an embodiments of a system of this invention including a central processing unit and a plurality (here four) motions sensors having active zones pointing in the +x direction.

Referring now to FIG. 3A, an embodiment of a motion sensing apparatus of this invention, generally 300, is shown to include four motion sensors 302a-d having fields of view or active sensing zones 304a-d and a processing unit 306 in active communication with the sensors 302a-d via communication pathways 308a-d. Within the fields of view or active sensing zones 304a-d, motion or movement may be detected or sensed by the respective sensors 302a-d. The fours sensor 302a-d comprise an sensor array 310. The sensor array 310 is show here with all sensors 302a-d having their active zones 304a-d pointing only in one direction, +x. Of course, it should be recognized that the sensor array 310 may have any desired unidirectional configuration.

Figure 3B:
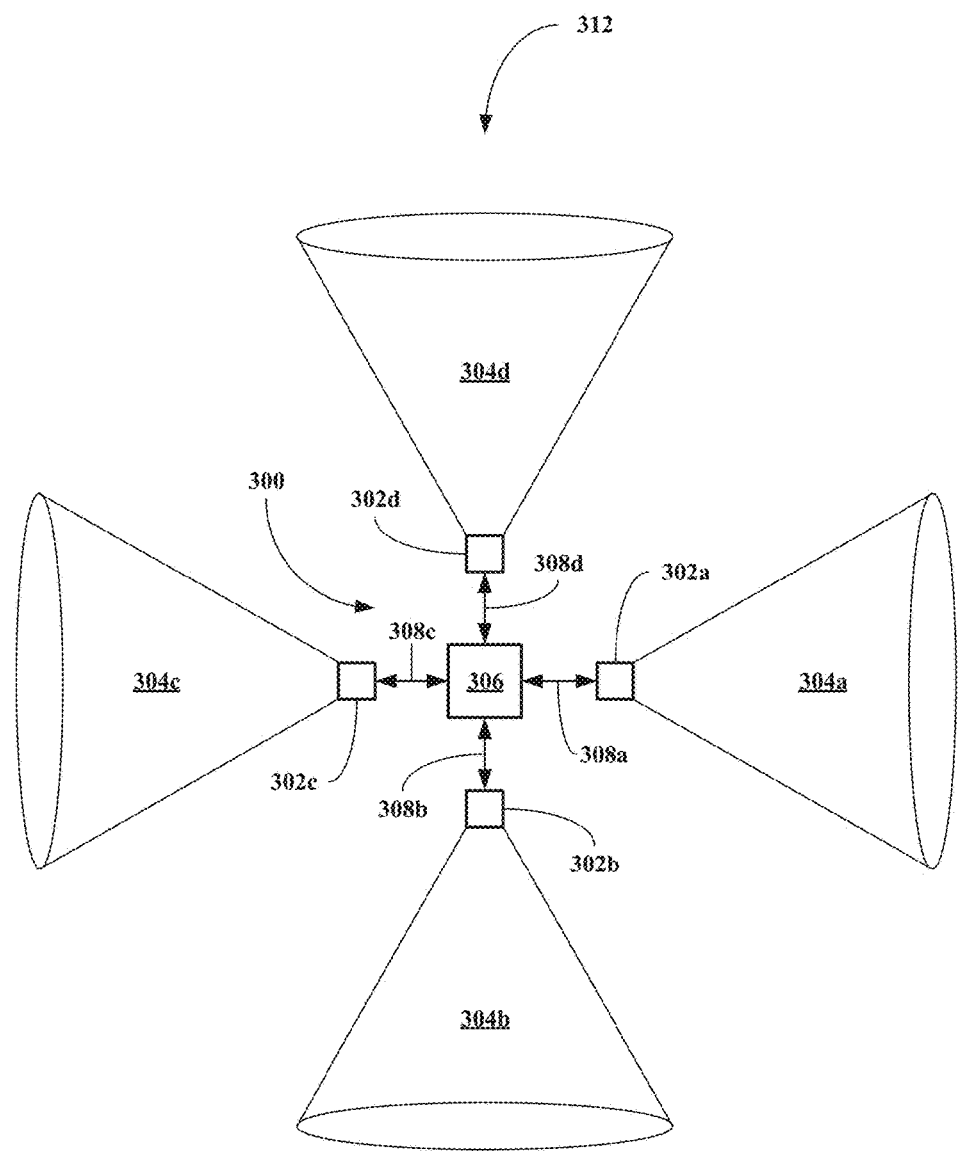
FIG. 3B depicts an embodiments of a system of this invention including a central processing unit and a plurality (here four) motions sensors having active zones pointing in the +x, −y, −x and +y directions.

Referring now to FIG. 3B, an embodiment of a motion sensing apparatus of this invention, generally 300, is shown to include four motion sensors 302a-d having fields of view or active sensing zones 304a-d and a processing unit 306 in active communication with the sensors 302a-d via communication pathways 308a-d. Within the fields of view or active sensing zones 304a-d, motion or movement may be detected or sensed by the respective sensors 302a-d. The fours sensor 302a-d comprise an sensor array 312. The sensor array 312 is show here with the four sensors 302a-d having their active zones 304a-d pointing in four different directions, +x, −x, +y, and −y, respectively. Of course, it should be recognized that the sensor array 312 may have any desired four directional configuration.

Figure 3C:
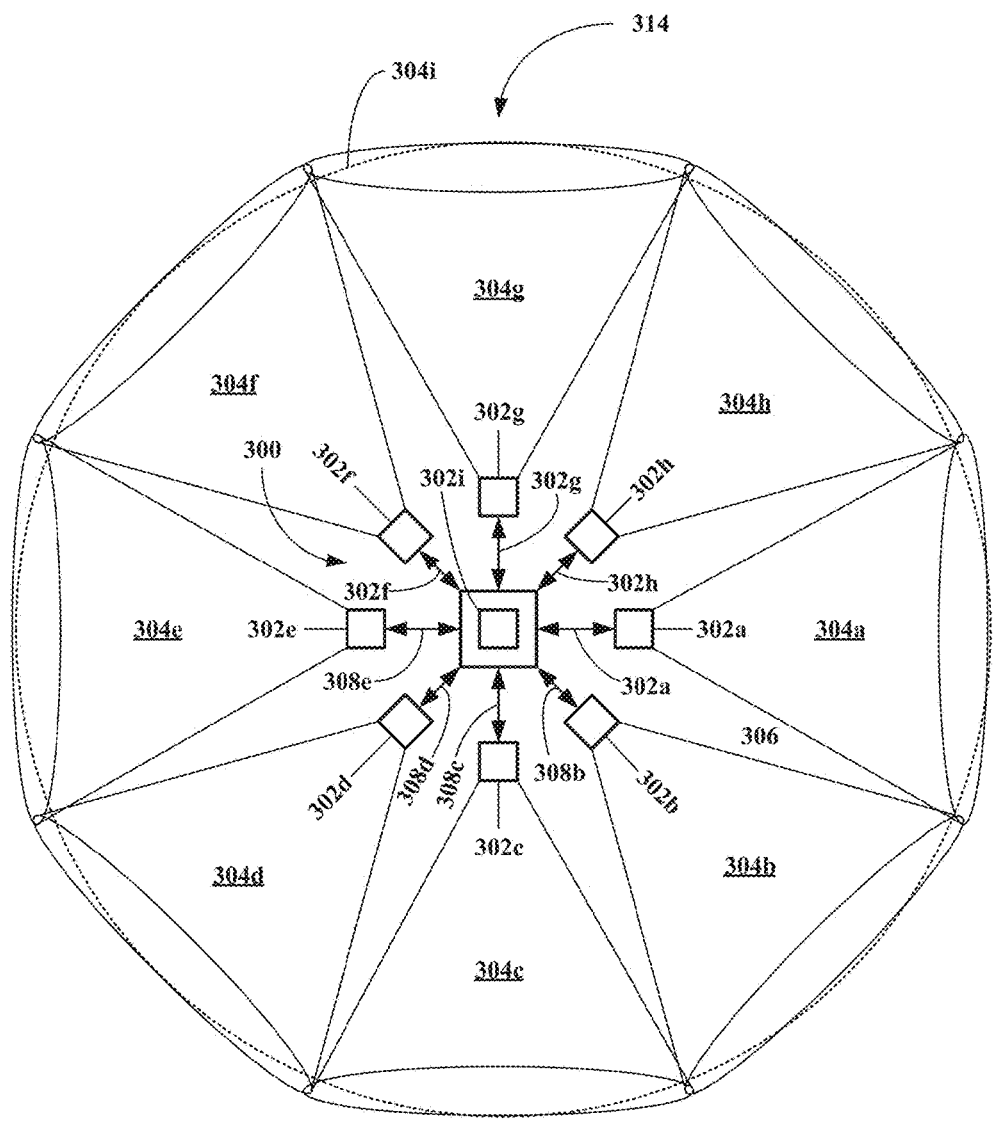
FIG. 3C depicts an embodiments of a system of this invention including a central processing unit and a plurality (here nine) motions sensors having active zones pointing in the +x, +x−y, −y, −x−y, −x, −x+y, +y, +x+y, and +z directions.

Referring now to FIG. 3C, an embodiment of a motion sensing apparatus of this invention, generally 300, is shown to include nine motion sensors 302a-i having fields of view or active sensing zones 304a-i and a processing unit 306 in active communication with the sensors 302a-i via communication pathways 308a-i. Within the fields of view or active sensing zones 304a-i, motion or movement may be detected or sensed by the respective sensors 302a-i. The nine sensor 302a-i comprise an sensor array 314. The sensor array 314 is show here with the nine sensors 302a-i having their active zone 304a-i pointing in nine different directions, +x, +x−y, −y, −x−y, −x, −x+y, +y, +x+y, and +z. The apparatus 300 may also include as tenth motion sensor 302j (not shown) having an active zone 304j (not shown) pointing in the −z direction. Of course, it should be recognized that the sensor array 314 may have any desired four directional configuration.

Figure 3D:
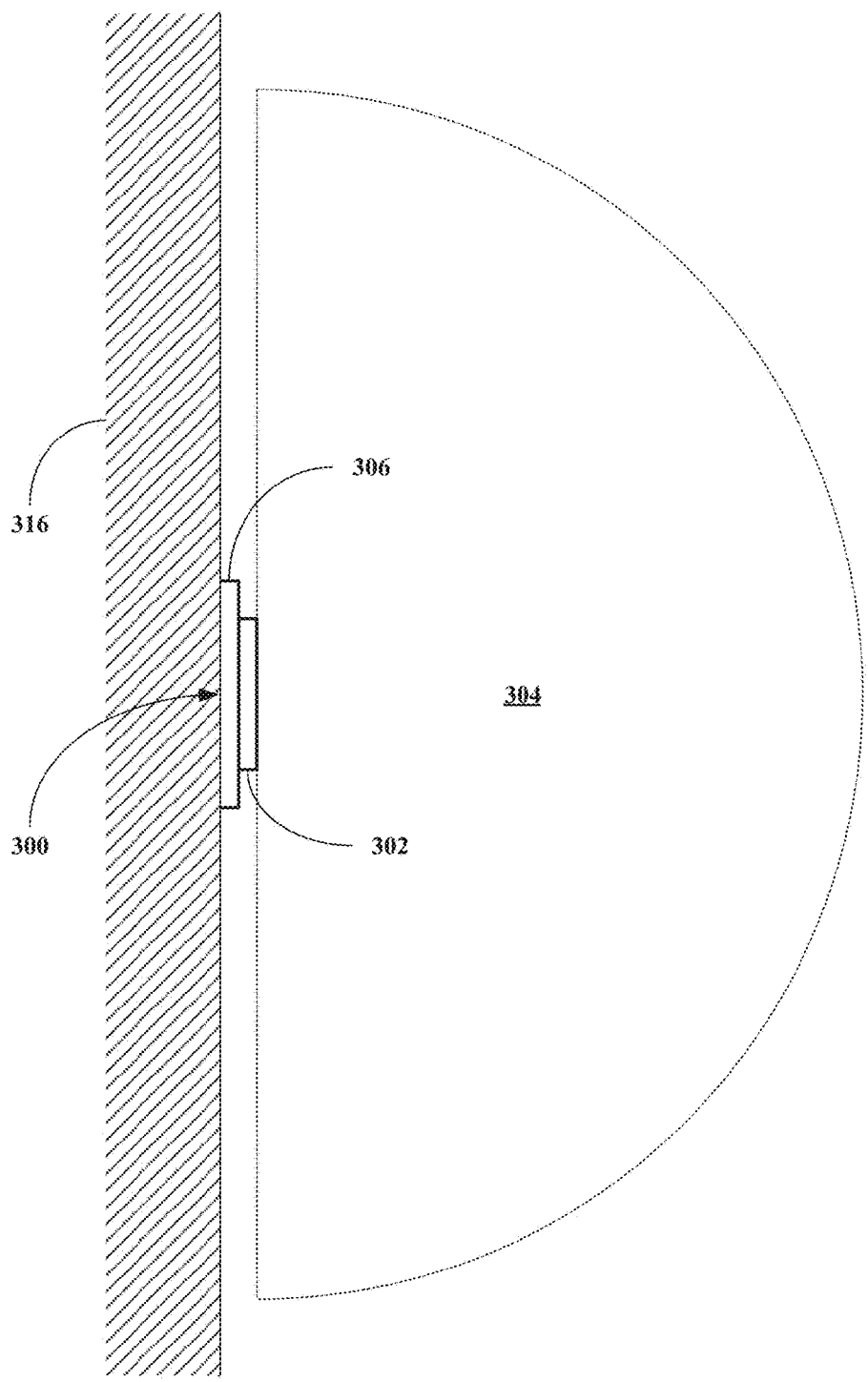
FIG. 3D depicts an embodiments of a system of this invention including a central processing unit and a plurality (here four) motions sensors.

Referring now to FIG. 3D, an embodiment of a motion sensing apparatus of this invention, generally 300, is shown to include a motion sensor 302 having field of view or active sensing zone 304 and a processing unit 306 in active communication with the sensors 302 via communication pathway via direct contact. The motion sensor 302 has a field of view or active sensing zone 304, shown here as a hemisphere. Within the field of view or active sensing zone 304, motion or movement may be detected or sensed. The apparatus 300 is mounted on a wall or a ceiling 316.

Referring now to FIGS. 4A-F, embodiments of uses of the present apparatuses and systems of this invention are shown. Looking at FIG. 4A, the apparatuses and systems is used to control lights in a room 400 including a left wall 402, a right wall 404, a bottom wall 406, and a top wall 408. The left wall 402 includes lights 410; the right wall 404 includes lights 412; the bottom wall 406 includes lights 414; and the top wall 408 includes lights 416. Not shown here, the user has already used the apparatuses and systems of this invention to select lights in the room 400, instead of a sound system, a TV system, a security system, or any other controllable system associated with room 400 and controllable from within the room 400. In these figures, all of the lights 410, 412, 414, and 416 are all in their maximum intensity state. It should be recognized that the starting point of each light may be the same or different and the effect of the motion will proportionally change the intensity of each light in accord with the properties of the motion.

Figure 4A:
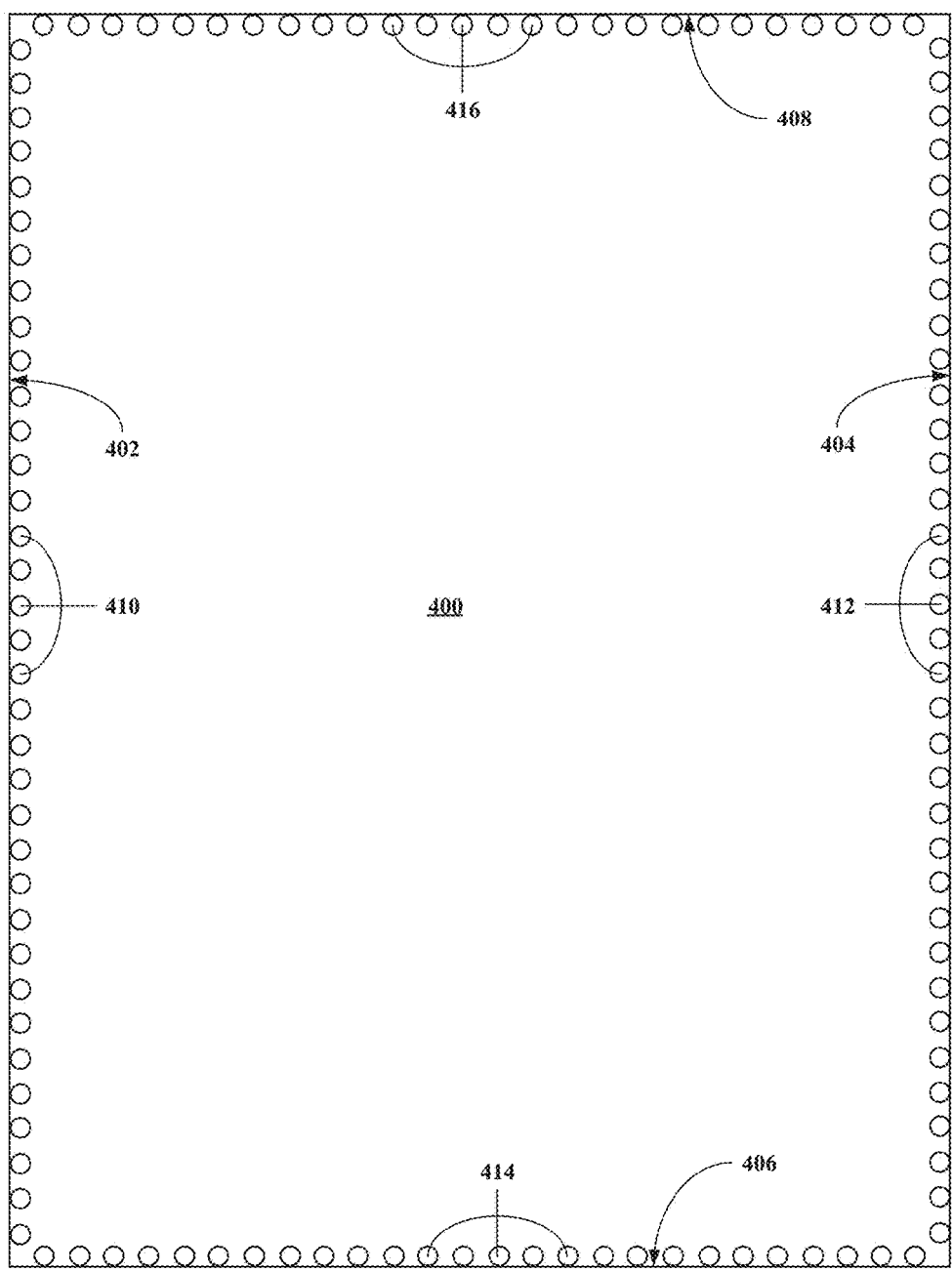
FIGS. 4A-F depict uses of the apparatuses, systems, and methods of this invention to control lights within a room.
Figure 4B:
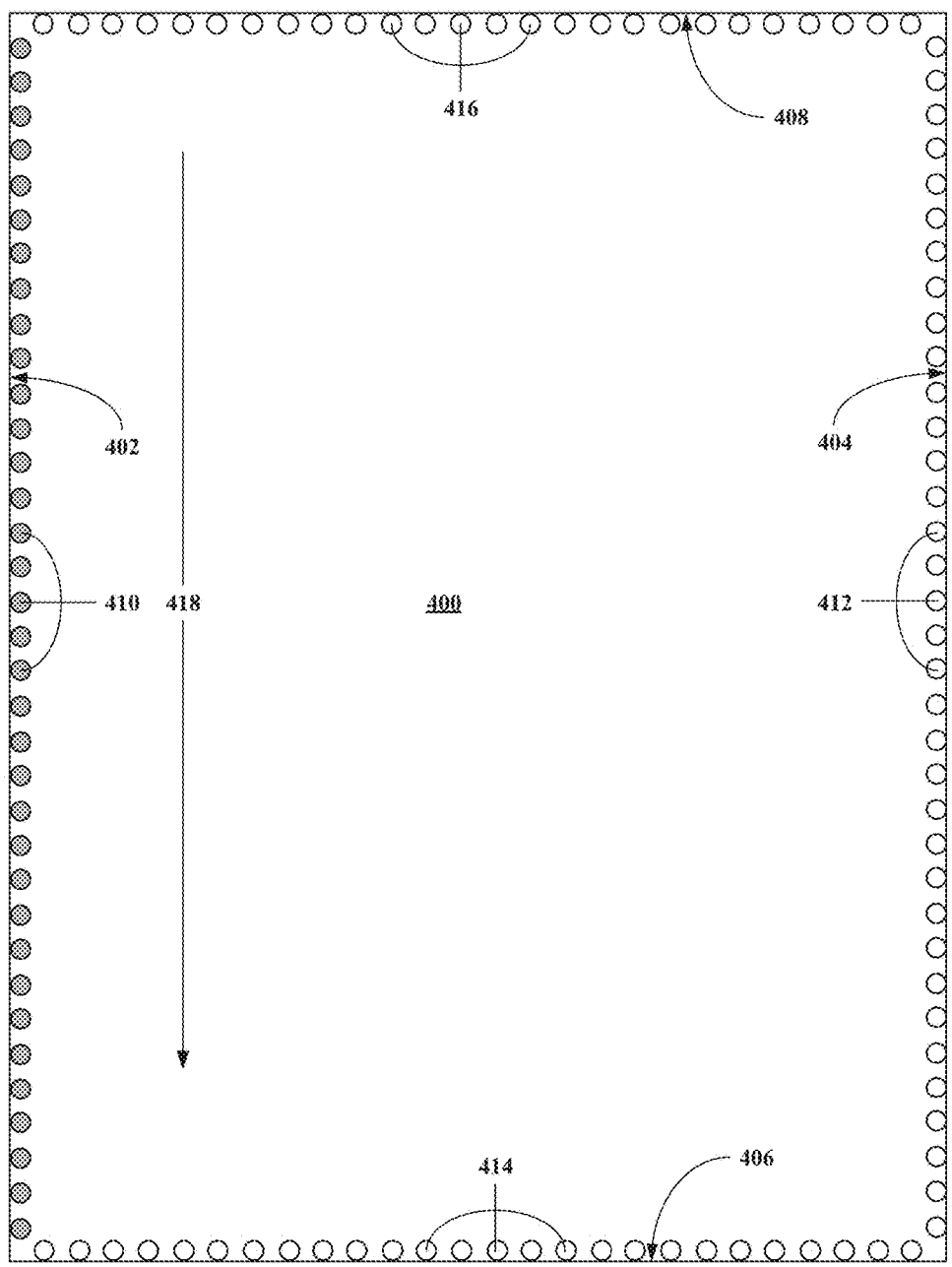

Looking at FIG. 4B, the apparatuses or systems of this invention recognizes motion 418 in a downward direction to the right of a center of the room 400. The motion 418 is at a constant velocity and no acceleration causing all of the left wall lights 410 to dim based on the velocity of the motion 418. Thus, slower downward motion would cause the lights 410 to dim less than faster motion downward would cause the light 410 to dim more. The user could also start the motion and hold, which would cause the light to dim until the user moves again as which point the dimming would stop.

Figure 4C:
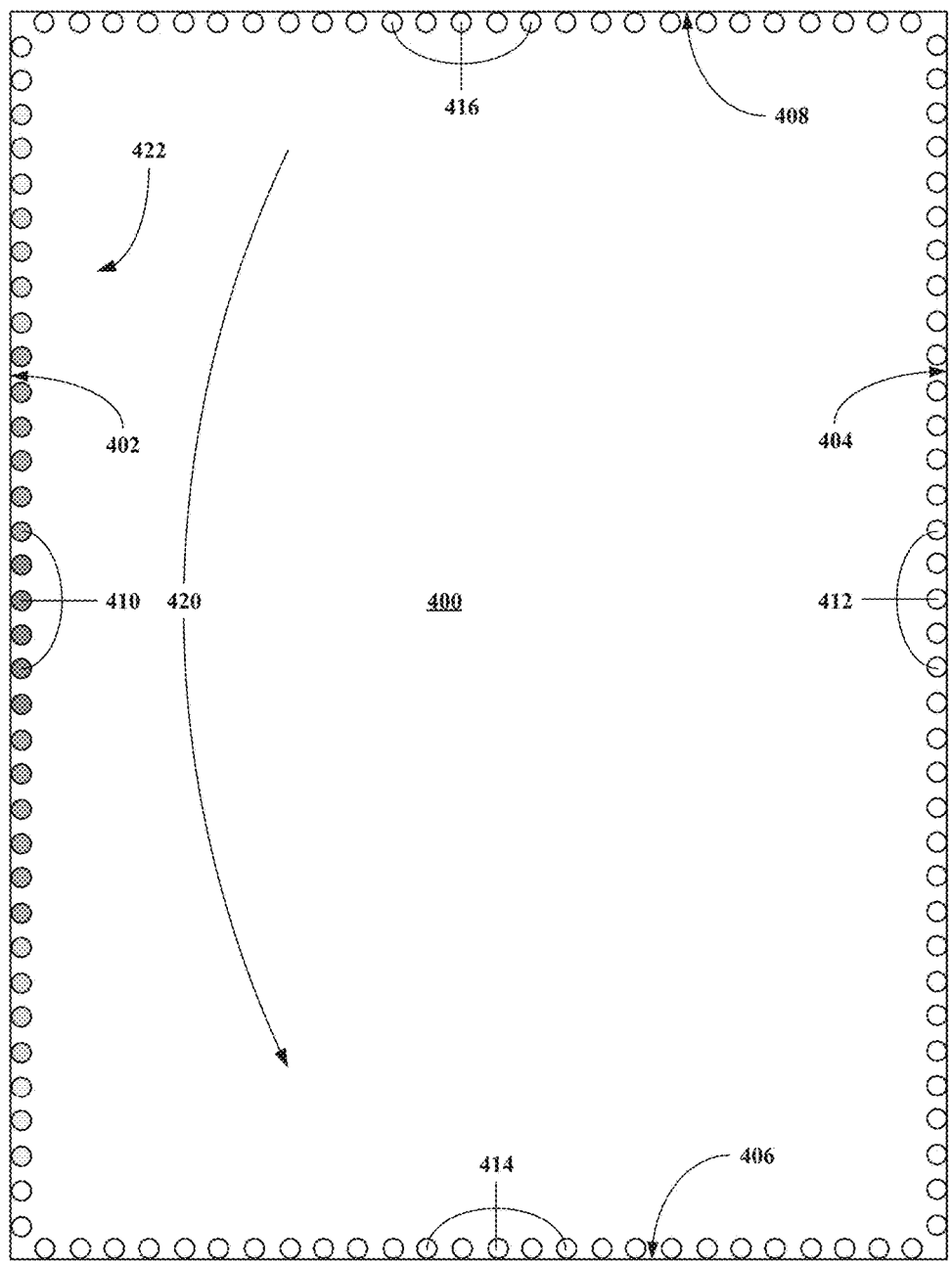

Looking at FIG. 4C, the apparatuses or systems of this invention recognizes motion 420 in a concave downward direction to the right of a center of the room 400. The motion 420 is at a constant angular velocity and no angular acceleration causing the left wall lights 410 to dim in a pattern 422, which differentially dims the lights 410 from the left wall edges to its center with the greatest dimming at the center of the wall 402 and the lest dimming at the edges of the wall 402.

Figure 4D:
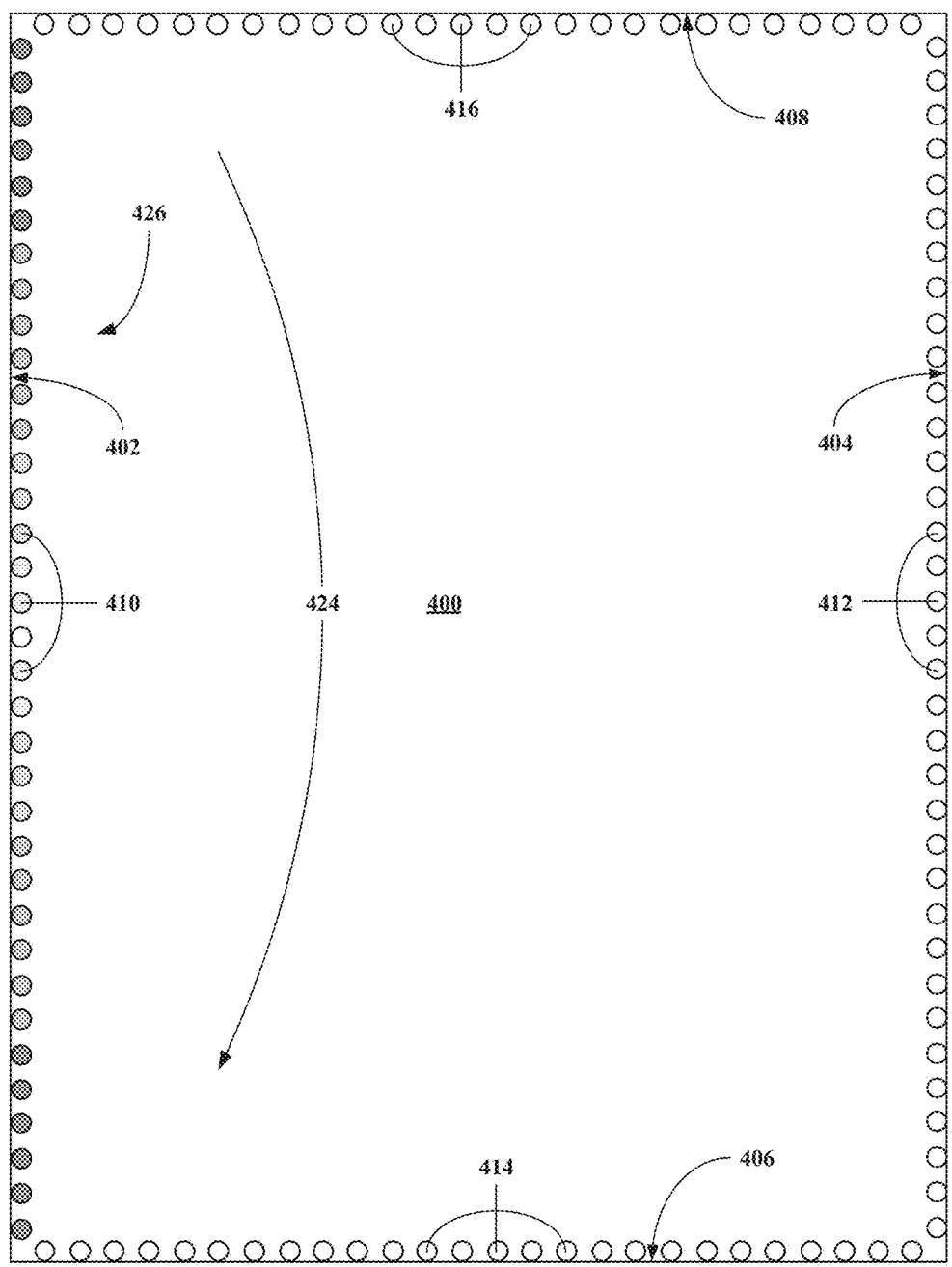

Looking at FIG. 4D, the apparatuses or systems of this invention recognizes motion 424 in a convex downward direction to the right of a center of the room 400. The motion 420 is at a constant angular velocity and no angular acceleration causing the left wall lights 410 to dim in a pattern 426, which differentially dims the lights 410 from the left wall edges to its center with the greatest dimming at the edges of the wall 402 and the lest dimming at the center of the wall 402.

Figure 4E:
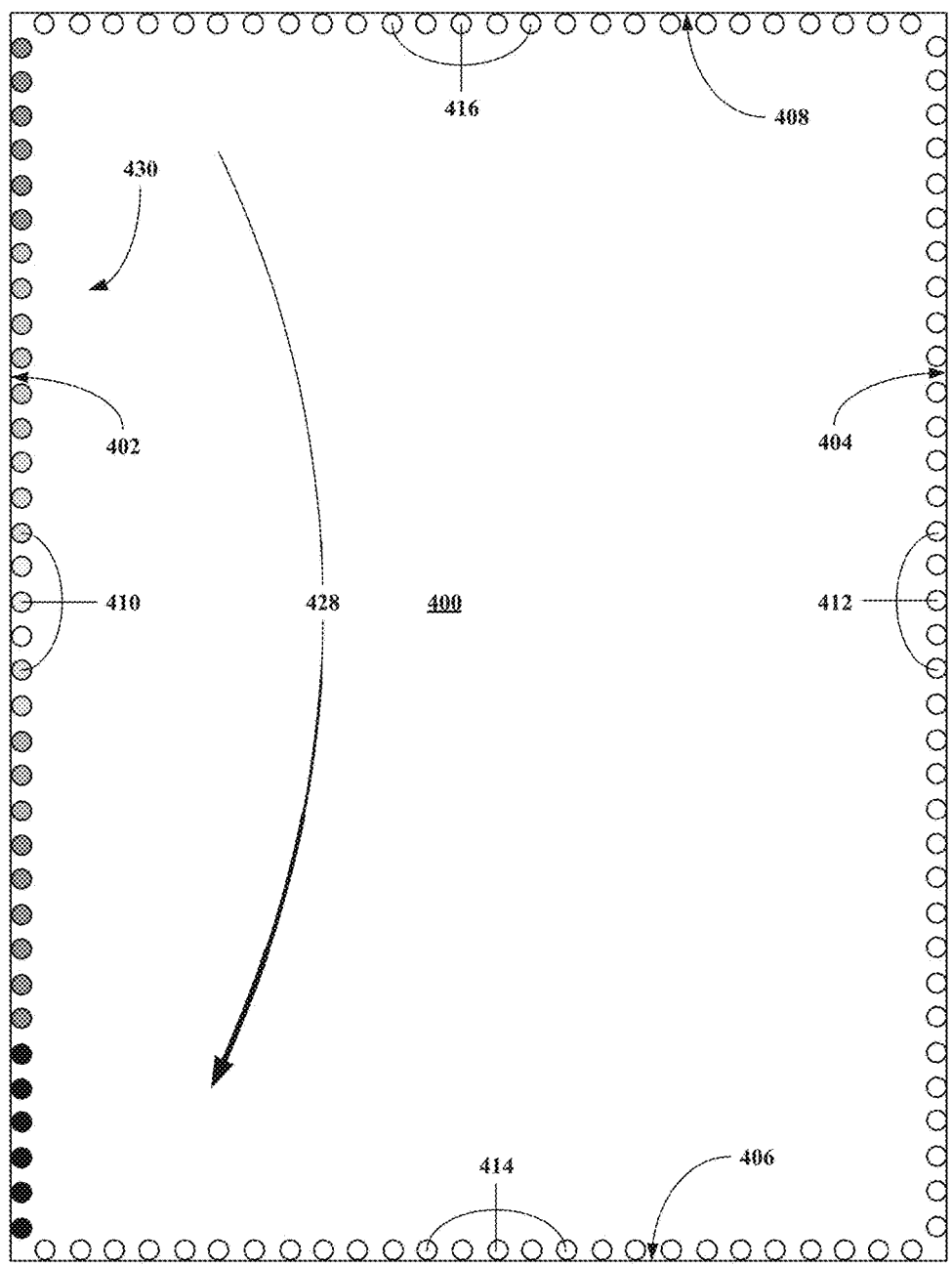

Looking at FIG. 4E, the apparatuses or systems of this invention recognizes motion 428 in a variable convex downward direction to the right of a center of the room 400. The motion 428 is variable in that the angular velocity increases as the motion proceeds downward, i.e., the motion 428 includes angular acceleration. The motion 428 causes the left wall lights 410 to dim in a pattern 430, which differentially dims the lights 410 from the left wall edges to its center with the greatest dimming at the lower edge, less dimming at the upper edge and the least dimming at the center of the wall 402. Thus, the dimming pattern of the lights conforms to the changes in the velocity of the motion. By changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

Figure 4F:
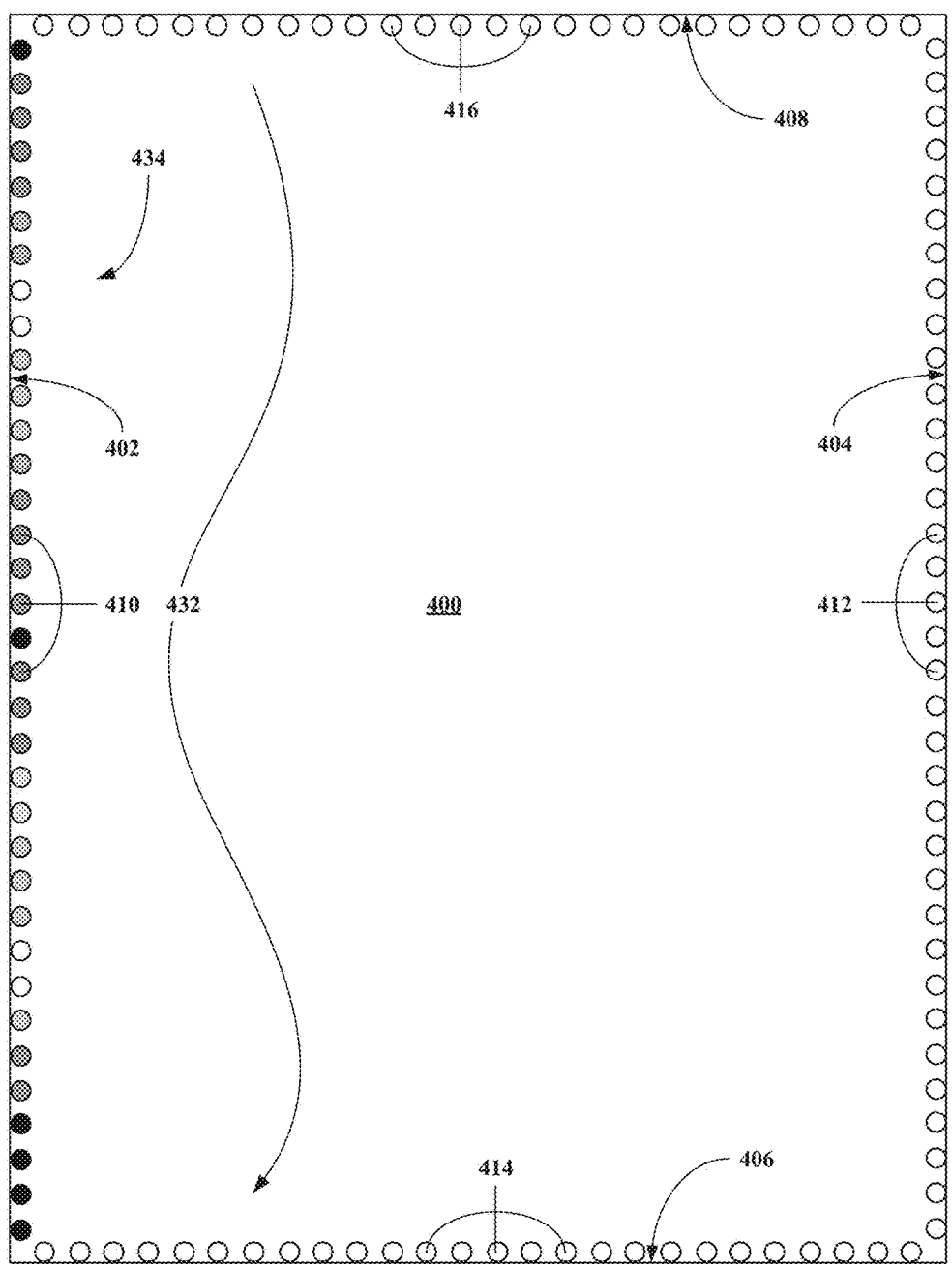

Looking at FIG. 4F, the apparatuses or systems of this invention recognizes motion 432 in a sinusoidal downward motion to the right of a center of the room 400. The motion 420 is at a constant angular velocity and no angular acceleration causing the left wall lights 410 to dim in a pattern 434, which differentially dims the lights 410 from the left wall edges to its center in conformity to the closeness of the motion 432 to each of the light 410. Again, by changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

Referring now to FIGS. 5A-F, embodiments of uses of the present apparatuses and systems of this invention are shown. Looking at FIG. 5A, the apparatuses and systems is used to control lights in a room 500 including a left wall 502, a right wall 504, a bottom wall 506, and a top wall 508. The left wall 502 includes lights 510; the right wall 504 includes lights 512; the bottom wall 506 includes lights 514; the top wall 508 includes lights 516. Not shown here, the user has already used the apparatuses and systems of this invention to select lights in the room 500, instead of a sound system, a TV system, a security system, or any other controllable system associated with room 500 and controllable from within the room 500. In these figures, all of the lights 510, 512, 514, and 516 are all in their minimum intensity or off state. It should be recognized that the starting point of each light may be the same or different and the effect of the motion will proportionally change the intensity of each light in accord with the properties of the motion.

Figure 5A:
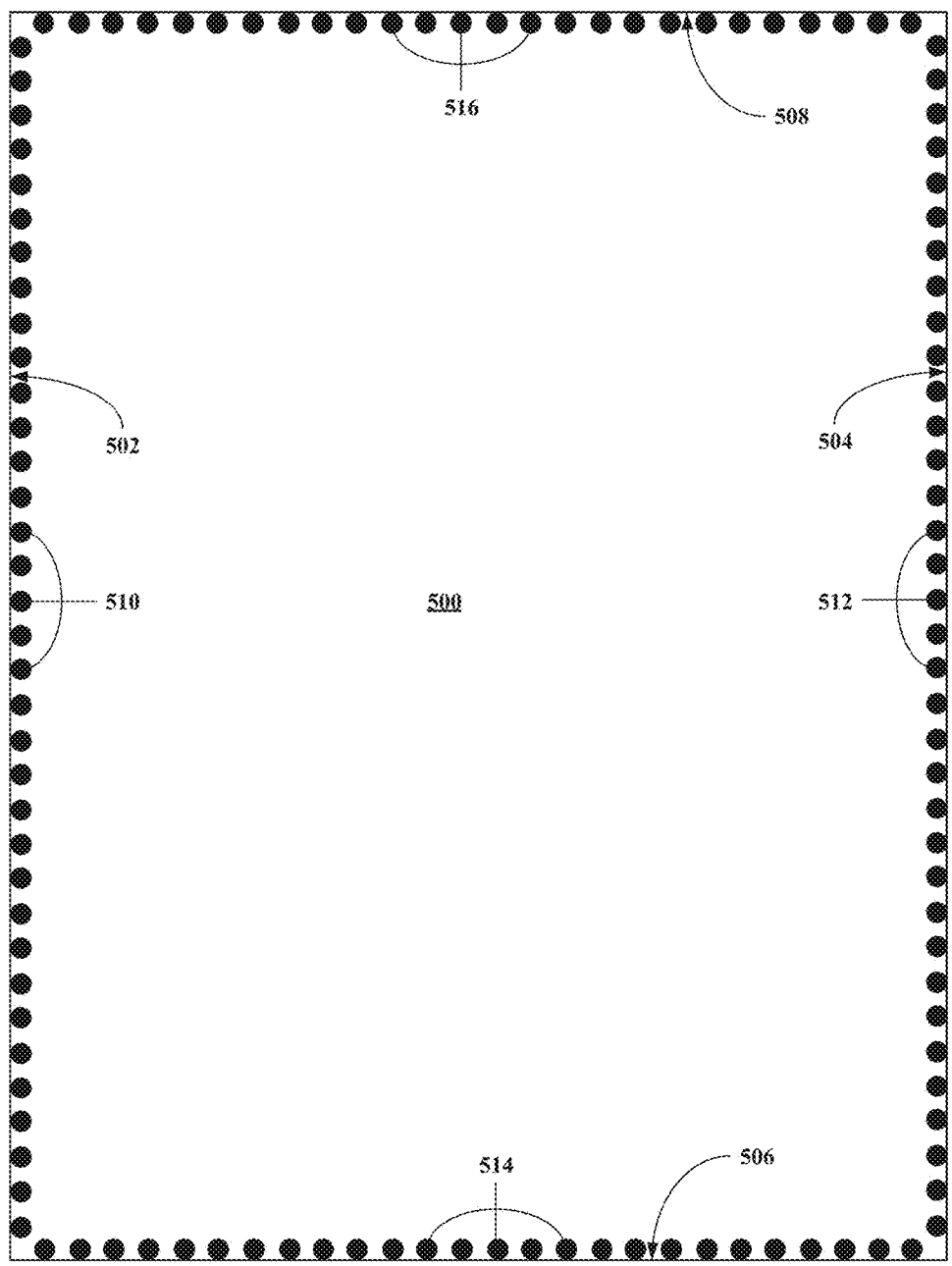
FIGS. 5A-D depict other uses of the apparatuses, systems, and methods of this invention to control lights within a room.
Figure 5B:
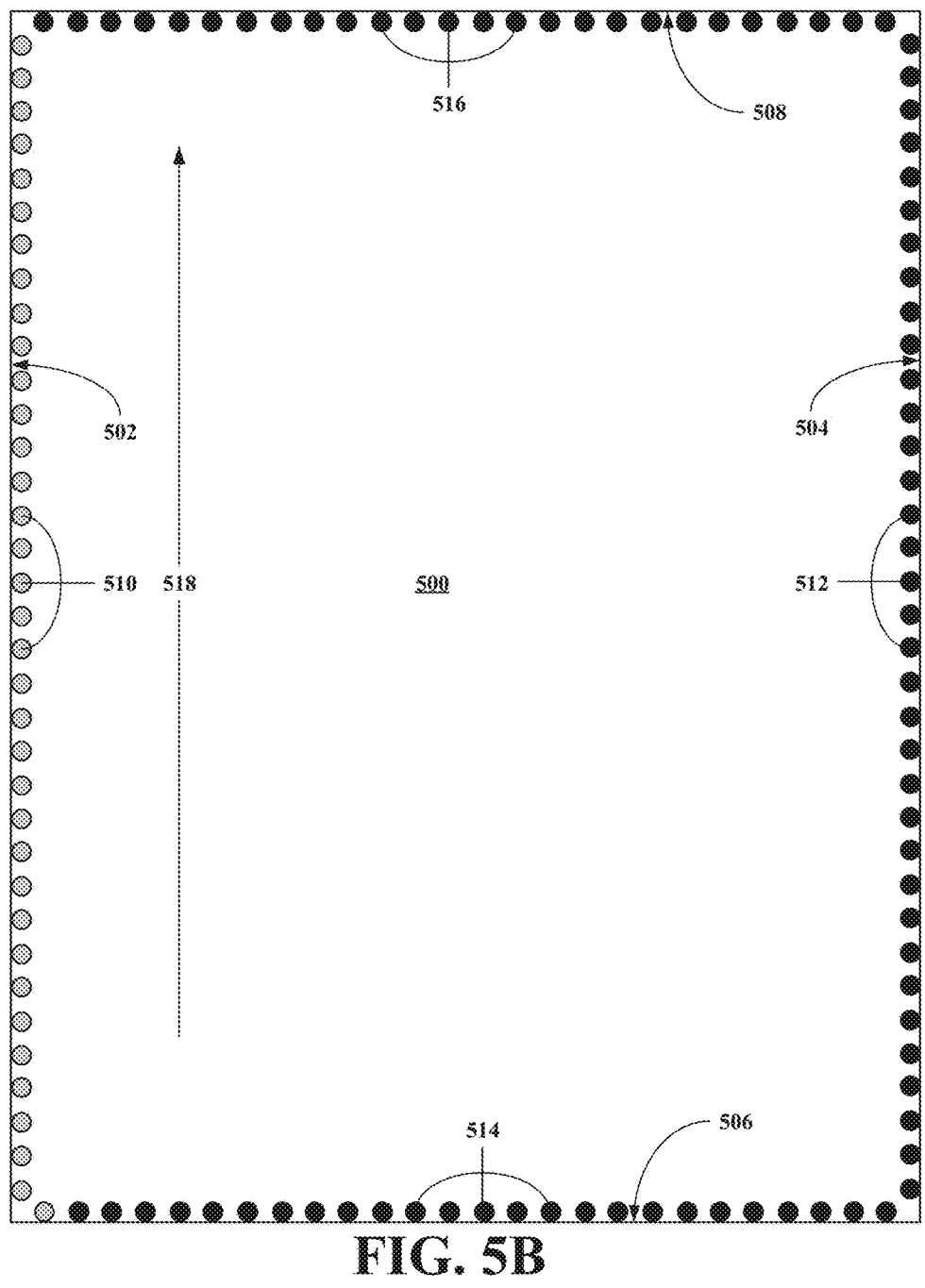

Looking at FIG. 5B, the apparatuses or systems of this invention recognizes motion 518 in a upward direction to the right of a center of the room 500. The motion 518 is at a constant velocity and no acceleration causing all of the left wall lights 510 to brighten based on the velocity of the motion 518. Thus, slower upward motion would cause the lights 510 to brighten less than, faster motion upward would cause the light 510 to brighten more. The user could also start the motion and hold, which would cause the light to brighten until the user moves again as which point the brightening would stop.

Figure 5C:
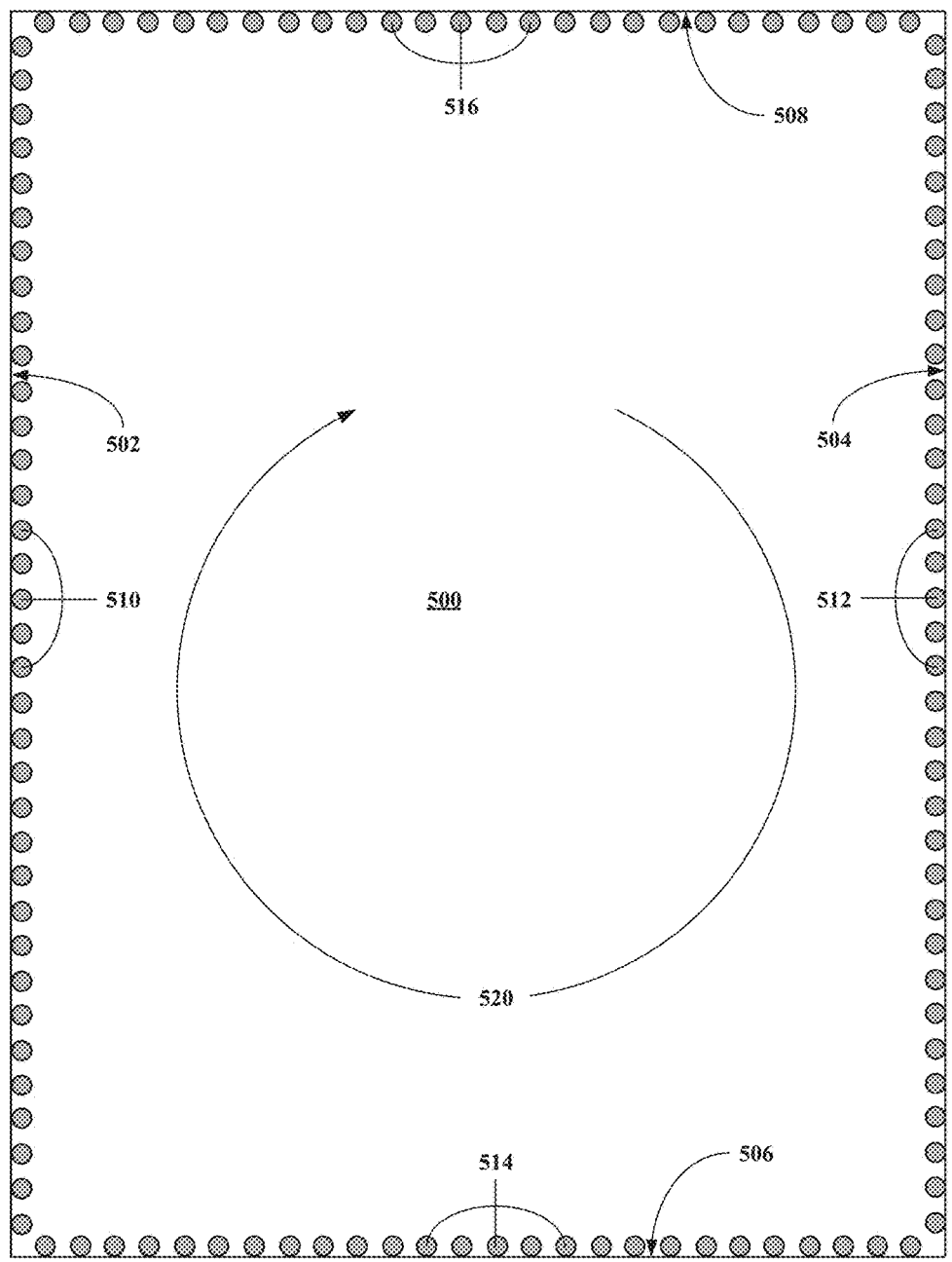

Looking at FIG. 5C, the apparatuses or systems of this invention recognizes motion 520 in a circular direction. The motion 520 is at a constant angular velocity and no angular acceleration causing all of the lights 510, 512, 514, and 516 to brighten based on the velocity of the motion 520. Thus, slower upward motion would cause the lights 510 to brighten less than, faster motion upward would cause the light 510 to brighten more. The user could also start the motion and hold, which would cause the light to brighten until the user moves again as which point the brightening would stop.

Figure 5D:
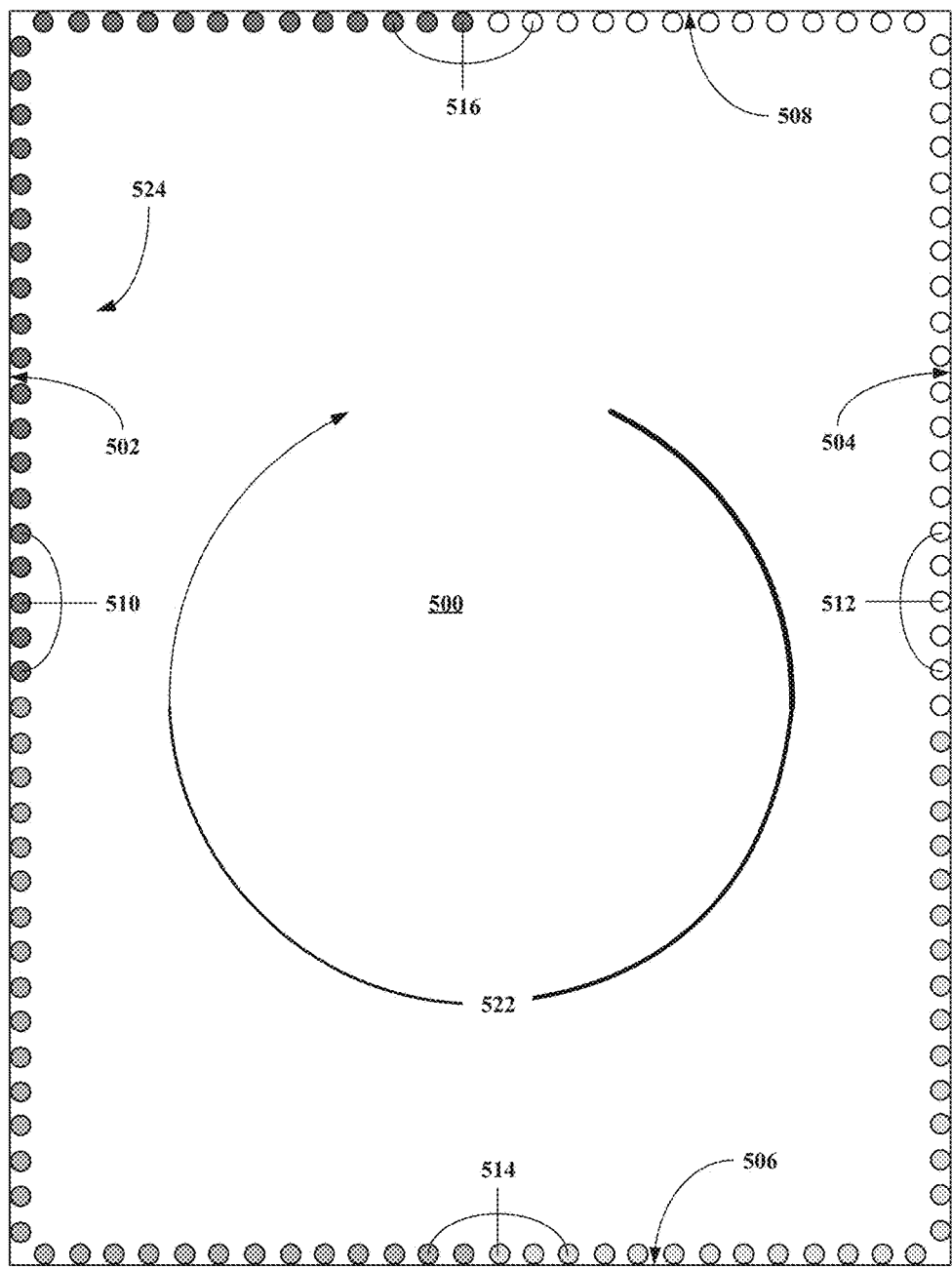

Looking at FIG. 5D, the apparatuses or systems of this invention recognizes motion 522 in a variable circular direction. The motion 522 have a variable angular velocity or an angular acceleration causing all of the lights 510, 512, 514, and 516 to brighten based on the variable velocity or acceleration properties of the motion 522. In this case, the velocity starts out high and continuously reduces so that the lights 510, 512, 514, and 516 to brighten accordingly. Again, by changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

Referring now to FIGS. 6A-F, embodiments of uses of the present apparatuses and systems of this invention are shown. Looking at FIG. 6A, the apparatuses and systems is used to control lights in a room 600 including a left wall 602, a right wall 604, a bottom wall 606, a top wall 608, and a ceiling 610. The left wall 602 includes lights 612; the right wall 604 includes lights 614; the bottom wall 606 includes lights 616; the top wall 608 includes lights 618, and the ceiling 610 includes lights 620. Not shown here, the user has already used the apparatuses and systems of this invention to select lights in the room 600, instead of a sound system, a TV system, a security system, or any other controllable system associated with room 600 and controllable from within the room 600.

Figure 6A:
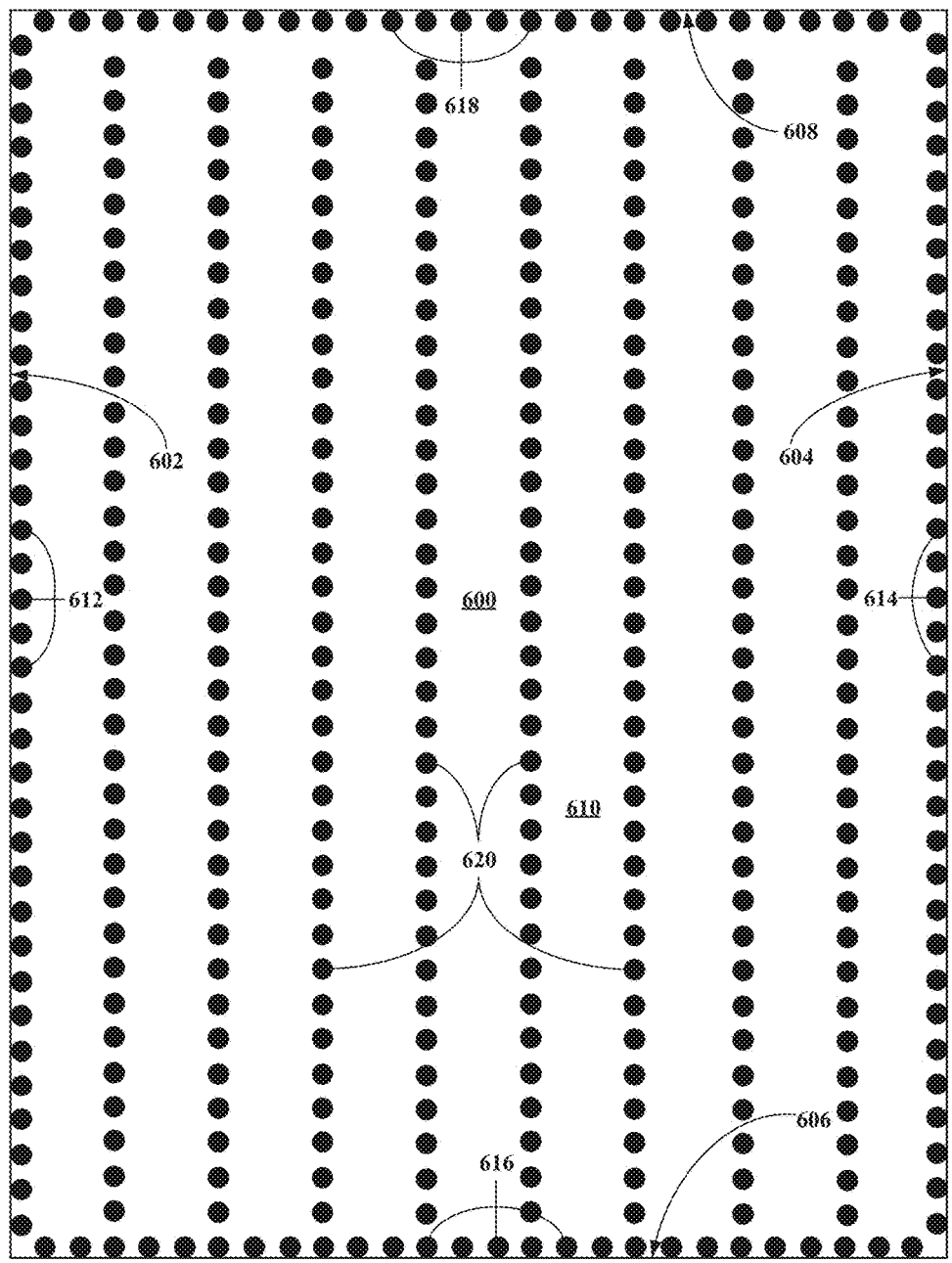
FIGS. 6A-B depict other uses of the apparatuses, systems, and methods of this invention to control lights within a room.
Figure 6B:
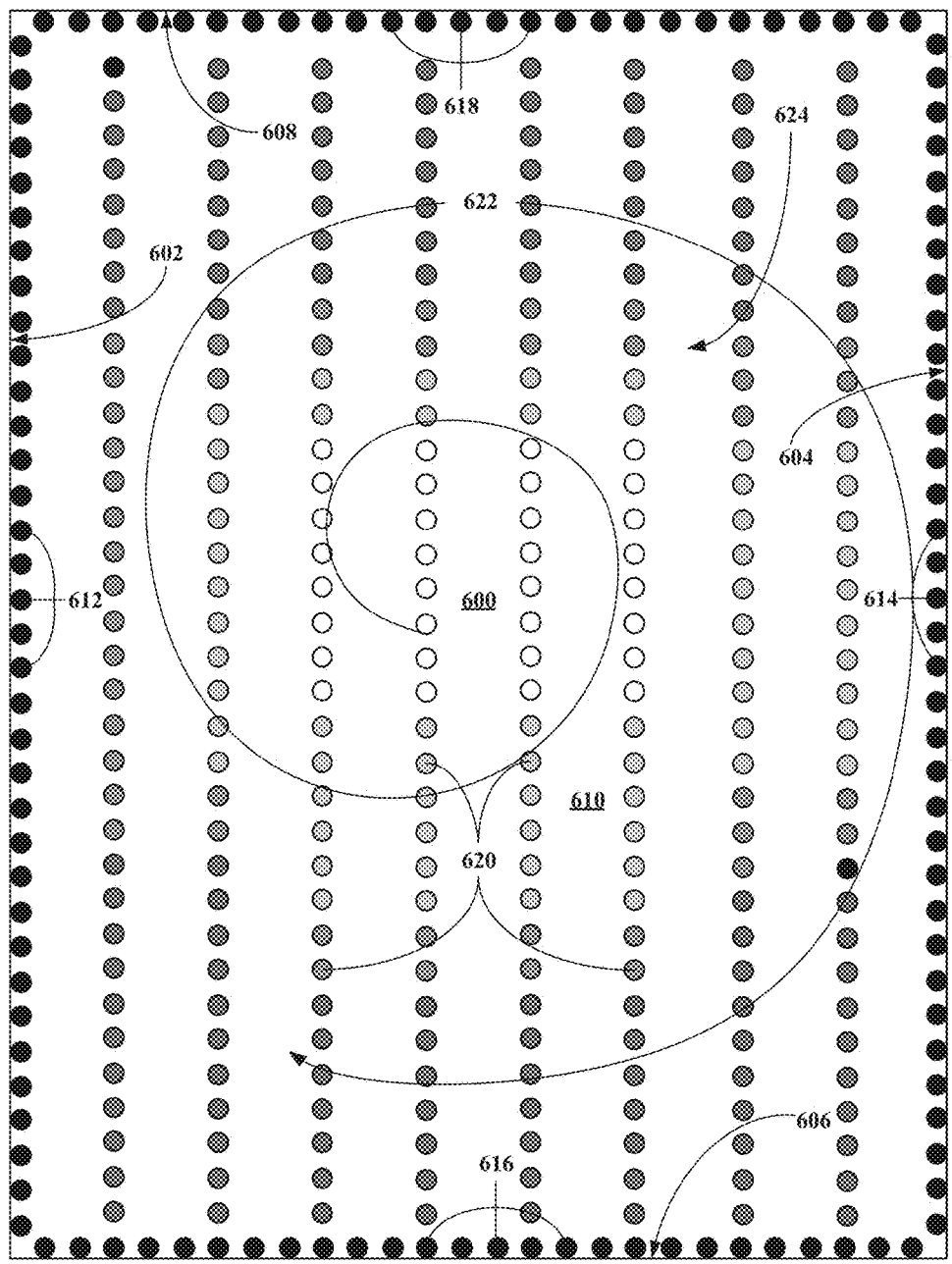

Looking at FIG. 6B, the apparatuses or systems of this invention recognizes motion 622 in a upward pointing spiral (not visual from the flat perspective of the figure). The motion 622 has a regular spiral angular velocity causing all of the lights 612, 614, 616, 618, and 620 to brighten in a pattern 624 in accord with the upward pointing spiral motion 622. Again, by changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

From these examples, it is apparent that the apparatuses, systems and methods of this invention may be used to select and simultaneously control one, a plurality or all objects and/or attributes associated with the objects in accord with the nature of the motions. Thus, the motion properties can be used to differentially control the objects and/or attributes associated therewith in conformity to the motions. Each properties of the motions may be used to control all of the objects based on distance, direction, velocity, acceleration and/or changes thereof so that complex selection and control of the objects can occur quickly, effectively and efficiently.

The previous figures and associated description are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, speed of motion, acceleration of motion, changes an any of these properties, rates of changes in any of these properties, or mixtures and combinations thereof to control a single controllable attribute of the object such as lights. However, the systems, apparatuses, and methods of this invention are also capable of using motion properties and/or characteristics to control two, three, or more attributes of an object. Additionally, the systems, apparatuses, and methods of this invention are also capable of using motion properties and/or characteristics from a plurality of moving objects within a motion sensing zone to control different attributes of a collection of objects. For example, if the lights in the above figures are capable of color as well as brighten, then the motion properties and/or characteristic may be used to simultaneously change color and intensity of the lights or one sensed motion could control intensity, while another sensed motion could control color. For example, if an artist wanted to paint a picture on a computer generated canvas, then motion properties and/or characteristic would allow the artist to control the pixel properties of each pixel on the display using the properties of the sensed motion from one, two, three, etc. sensed motions. Thus, the systems, apparatuses, and methods of this invention are capable of converting the motion properties associated with each and every object being controlled based on the instantaneous properties values as the motion traverse the object in real space or virtual space.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method comprising:
sensing a first motion via at least one motion sensor, wherein at least one property of the first motion exceeds at least one threshold motion criterion,
producing a first output signal from the at least one motion sensor corresponding to the first motion,
converting the first output signal via a processing unit in communication with the at least one motion sensor into a display command, processing via the processing unit the display command to display a plurality of objects on a display device in communication with the processing unit, in response to the first output signal, causing a predetermined selection of all of the objects or a selection of one or more objects aligned or substantially aligned with a direction of the first motion, sensing, via the at least one motion sensor, a motion comprising a velocity, a velocity profile, an acceleration, and/or an acceleration profile, producing an output signal from the at least one motion sensor corresponding to the sensed motion, converting the output signal via the processing unit into a command capable of simultaneously controlling one, some, or all of the selected objects and/or one, some, or all attributes associated with the selected objects, and processing the command to simultaneously control one, some, or all of the selected objects and/or one, some, or all of the attributes associated with the selected objects in conformity with the velocity, the velocity profile, the acceleration, and/or the acceleration profile via the processing unit until the output signal from the at least one motion sensor stops or a body, body part, or object under the control of the body part moves outside of an active sensing zone of the at least one motion sensor.

2. The method of claim 1, wherein the controlling comprises adjusting one, some or all of the attributes associated with the object or the objects in proportion to the velocity, the velocity profile, the acceleration, and/or the acceleration profile.

3. The method of claim 1, wherein the objects are lights and the attribute is intensity and/or color or the objects are pixels associated with a virtual canvas and the attributes are pixel properties or the objects are military or law enforcement assets and the attributes are deployment, replayment, rearrangement, and/or manipulation of assets to address rapid changing situations.

4. The method of claim 1, wherein if the motion includes a brief timed hold, the controlling comprises adjusting one, some or all of the attributes associated with the object or the objects in proportion to the velocity, the velocity profile, the acceleration, and/or the acceleration profile to preset levels.

5. The method of claim 4, wherein the objects are lights and the attribute is intensity and/or color or the objects are pixels associated with a virtual canvas and the attributes are pixel properties or the objects are military or law enforcement assets and the attributes are deployment, redeployment, rearrangement, and/or manipulation of assets to address rapid changing situations.

6. The method of claim 1, wherein:
the at least one motion sensor is selected from the group consisting of digital cameras, optical scanners, optical roller ball devices, joy sticks, touch pads, inductive pads, capacitive pads, holographic devices, laser tracking devices, thermal devices, acoustic devices, devices for tracking body or body part movement, EMF sensors, wave form sensors, arrays of motion sensors, and combinations thereof, and the objects are selected from the group consisting of lighting devices, cameras, ovens, dishwashers, stoves, sound systems, display systems, alarm systems, control systems, medical devices, robots, robotic control systems, hot and cold water supply devices, air conditioning systems, heating systems, fuel delivery systems, energy management systems, product delivery systems, ventilation systems, air handling systems, computers and computer systems, chemical plant control systems, computer operating systems, graphics systems, business software systems, word processor systems, internet browsers, accounting systems, military systems, control systems, remote control systems, any program, routine, object, and/or element associated with any of the systems, virtual constructs capable of being controlled by a processing unit, and mixtures or combinations thereof.

7. A method comprising:
receiving via a processing unit in communication with a motion sensor a first input corresponding to a first motion having at least one property exceeding at least one threshold motion criterion, displaying a plurality of objects on a display device in communication with the processing unit, where one, some, or all of the object having at least one attribute, in response to the first output signal, causing a predetermined selection of all of the objects or a selection of one or more objects aligned or substantially aligned with a direction of the first motion, receiving via the processing unit an input from the motion sensor corresponding to a motion having properties including a velocity, a velocity profile, an acceleration, and/or an acceleration profile, and simultaneously controlling via the processing unit one, some, or all of the selected objects and/or one, some, or all attributes associated with the selected objects in conformity with the velocity, the velocity profile, the acceleration, and/or the acceleration profile until the input from the motion sensor stops or a body, body part, or object under the control of the body part moves outside of an active sensing zone of the motion sensor, wherein the objects are in communication with the processing unit, and wherein the objects comprise real world objects, virtual objects or combinations thereof.

8. The method of claim 7, wherein the controlling comprises adjusting one, some or all of the attributes associated with the object or the objects in proportion to the velocity, the velocity profile, the acceleration, and/or the acceleration profile.

9. The method of claim 8, wherein the objects are lights and the attribute is intensity and/or color or the objects are pixels associated with a virtual canvas and the attributes are pixel properties or the objects are military or law enforcement assets and the attributes are deployment, replayment, rearrangement, and/or manipulation of assets to address rapid changing situations.

10. The method of claim 7, wherein if the motion includes a brief timed hold, the controlling comprises adjusting one, some or all of the attributes associated with the object or the objects in proportion to the velocity, the velocity profile, the acceleration, and/or the acceleration profile to preset levels.

11. The method of claim 10, wherein the objects are lights and the attribute is intensity and/or color or the objects are pixels associated with a virtual canvas and the attributes are pixel properties or the objects are military or law enforcement assets and the attributes are deployment, replayment, rearrangement, and/or manipulation of assets to address rapid changing situations.

12. The method of claim 7, wherein:
the at least one motion sensor is selected from the group consisting of digital cameras, optical scanners, optical roller ball devices, joy sticks, touch pads, inductive pads, capacitive pads, holographic devices, laser tracking devices, thermal devices, acoustic devices, devices for tracking body or body part movement, EMF sensors, wave form sensors, arrays of motion sensors, and combinations thereof, and the objects are selected from the group consisting of lighting devices, cameras, ovens, dishwashers, stoves, sound systems, display systems, alarm systems, control systems, medical devices, robots, robotic control systems, hot and cold water supply devices, air conditioning systems, heating systems, fuel delivery systems, energy management systems, product delivery systems, ventilation systems, air handling systems, computers and computer systems, chemical plant control systems, computer operating systems, graphics systems, business software systems, word processor systems, internet browsers, accounting systems, military systems, control systems, remote control systems, any program, routine, object, and/or element associated with any of the systems, virtual constructs capable of being controlled by a processing unit, and mixtures or combinations thereof.

13. A system comprising:

at least one motion sensor, wherein the at least one motion sensor:
- senses a first motion having at least one property of the first motion exceeds at least one threshold motion criterion,
- produces a first output signal corresponding to the first motion,
- senses a motion comprising a velocity, a velocity profile, an acceleration, and/or an acceleration profile, and
- produces an output signal corresponding to the sensed motion, a processing unit in communication with the at least one motion sensor, a plurality of objects in communication with or under control of the processing unit, wherein one, some or all of the objects include at least one attribute, wherein the processing unit:
- in response to the first motion, displays on a plurality of objects, wherein one, some, or all of the objects have at least one attribute,
- in response to the first motion, causes a predetermined selection of all of the objects or a selection of one or more objects aligned or substantially aligned with a direction of the first motion,
- converts the output signal into a command capable of simultaneously controlling one, some, or all of the selected objects and/or one, some, or all the attributes associated with the selected objects, and
- processes the command to simultaneously control one, some, or all of the selected objects and/or one, some, or all the attributes in conformity with the velocity, the velocity profile, the acceleration, and/or the acceleration profile via the processing unit,
- until the output signal from the at least one motion sensor stops or a body, body part, or object under the control of the body part moves outside of an active sensing zone of the at least one motion sensor, wherein the object or objects comprise real world objects, virtual objects, or combinations thereof.

14. The system of claim 13, further comprising:

a display device in communication with the processing unit and comprising a touch screen, and optionally a remote control unit in communication with the processing unit to provide remote control of the processing unit, wherein:
the display device, the at least one motion sensor, and the processing unit are integrated into a tablet, a computer, or a mobile device, the motion sensor is selected from the group consisting of digital cameras, optical scanners, optical roller ball devices, joy sticks, touch pads, inductive pads, capacitive pads, holographic devices, laser tracking devices, thermal devices, acoustic devices, devices for tracking body or body part movement, EMF sensors, wave form sensors, arrays of motion sensors, and combinations thereof, and the objects are selected from the group consisting of lighting devices, cameras, ovens, dishwashers, stoves, sound systems, display systems, alarm systems, control systems, medical devices, robots, robotic control systems, hot and cold water supply devices, air conditioning systems, heating systems, fuel delivery systems, energy management systems, product delivery systems, ventilation systems, air handling systems, computers and computer systems, chemical plant control systems, computer operating systems, graphics systems, business software systems, word processor systems, internet browsers, accounting systems, military systems, control systems, remote control systems, any program, routine, object, and/or element associated with any of the systems, virtual constructs capable of being controlled by a processing unit, and mixtures or combinations thereof.

15. The system of claim 13, wherein the controlling comprises adjusting one, some or all of the attributes associated with the object or the objects in proportion to the velocity, the velocity profile, the acceleration, and/or the acceleration profile.

16. The system of claim 15, wherein the objects are lights and the attribute is intensity and/or color or the objects are pixels associated with a virtual canvas and the attributes are pixel properties or the objects are military or law enforcement assets and the attributes are deployment, reployment, rearrangement, and/or manipulation of assets to address rapid changing situations.

17. The system of claim 13, wherein if the motion includes a brief timed hold, the controlling comprises adjusting one, some or all of the attributes associated with the object or the objects in proportion to the velocity, the velocity profile, the acceleration, and/or the acceleration profile to preset levels.

18. The system of claim 17, wherein the objects are lights and the attribute is intensity and/or color or the objects are pixels associated with a virtual canvas and the attributes are pixel properties or the objects are military or law enforcement assets and the attributes are deployment, reployment, rearrangement, and/or manipulation of assets to address rapid changing situations.

19. A system comprising:

a motion sensor, a processing unit, and a plurality of objects, wherein one, some or all of the objects include at least one attribute, wherein the processing unit:
- receives a first input from the motion sensor corresponding to a first motion having at least one property exceeding at least one threshold motion criterion, in response to the first input, displaying the objects on a display device in communication with the processing unit, in response to the first input, causes a predetermined selection of all of the objects or a selection of one or more objects aligned or substantially aligned with a direction of the first motion, receives an input from the motion sensor corresponding to a motion having properties including a velocity, a velocity profile, an acceleration, and/or an acceleration profile; and simultaneously controls one, some, or all of the selected objects, and/or one, some, or all the attributes in conformity with the velocity, the velocity profile, the acceleration, and/or the acceleration profile, until the input from the motion sensor stops or a body, body part, or object under the control of the body part moves outside of an active sensing zone of the motion sensor, wherein the objects are in communication with the processing unit, and wherein the objects comprise real world objects, virtual objects or combinations thereof.

20. The system of claim 19, further comprising:

a display device in communication with the processing unit and comprising a touch screen, and optionally a remote control unit in communication with the processing unit to provide remote control of the processing unit, wherein:

the display device, the at least one motion sensor, and the processing unit integrated into a tablet, a computer, or a mobile device, the motion sensor is selected from the group consisting of digital cameras, optical scanners, optical roller ball devices, joy sticks, touch pads, inductive pads, capacitive pads, holographic devices, laser tracking devices, thermal devices, acoustic devices, devices for tracking body or body part movement, EMF sensors, wave form sensors, arrays of motion sensors, and combinations thereof, and the objects are selected from the group consisting of lighting devices, cameras, ovens, dishwashers, stoves, sound systems, display systems, alarm systems, control systems, medical devices, robots, robotic control systems, hot and cold water supply devices, air conditioning systems, heating systems, fuel delivery systems, energy management systems, product delivery systems, ventilation systems, air handling systems, computers and computer systems, chemical plant control systems, computer operating systems, graphics systems, business software systems, word processor systems, internet browsers, accounting systems, military systems, control systems, remote control systems, any program, routine, object, and/or element associated with any of the systems, virtual constructs capable of being controlled by a processing unit, and mixtures or combinations thereof.

21. The system of claim 19, wherein the controlling comprises adjusting one, some or all of the attributes associated with the object or the objects in proportion to the velocity, the velocity profile, the acceleration, and/or the acceleration profile.

22. The system of claim 21, wherein the objects are lights and the attribute is intensity and/or color or the objects are pixels associated with a virtual canvas and the attributes are pixel properties or the objects are military or law enforcement assets and the attributes are deployment, reployment, rearrangement, and/or manipulation of assets to address rapid changing situations.

23. The system of claim 19, wherein if the motion includes a brief timed hold, the controlling comprises adjusting one, some or all of the attributes associated with the object or the objects in proportion to the velocity, the velocity profile, the acceleration, and/or the acceleration profile to preset levels.

24. The system of claim 23, wherein the objects are lights and the attribute is intensity and/or color or the objects are pixels associated with a virtual canvas and the attributes are pixel properties or the objects are military or law enforcement assets and the attributes are deployment, reployment, rearrangement, and/or manipulation of assets to address rapid changing situations.

* * * * *